United States Patent
Nakanishi

(10) Patent No.: US 11,447,578 B2
(45) Date of Patent: Sep. 20, 2022

(54) PRODUCTION METHOD FOR AQUEOUS PIGMENT DISPERSION

(71) Applicant: KAO CORPORATION, Tokyo (JP)

(72) Inventor: Ryo Nakanishi, Sakai (JP)

(73) Assignee: KAO CORPORATION, Tokyo (JP)

( * ) Notice: Subject to any disclaimer, the term of this patent is extended or adjusted under 35 U.S.C. 154(b) by 388 days.

(21) Appl. No.: 16/626,185

(22) PCT Filed: Jun. 28, 2018

(86) PCT No.: PCT/JP2018/024520
§ 371 (c)(1),
(2) Date: Dec. 23, 2019

(87) PCT Pub. No.: WO2019/009170
PCT Pub. Date: Jan. 10, 2019

(65) Prior Publication Data
US 2020/0216580 A1 Jul. 9, 2020

(30) Foreign Application Priority Data
Jul. 3, 2017 (JP) .............................. JP2017-130674

(51) Int. Cl.
| | | |
|---|---|---|
| *C08F 2/38* | (2006.01) | |
| *C09D 11/326* | (2014.01) | |
| *C09D 11/322* | (2014.01) | |
| *C08F 220/06* | (2006.01) | |
| *C08F 220/10* | (2006.01) | |
| *C08F 212/08* | (2006.01) | |
| *C08K 3/04* | (2006.01) | |
| *C08K 5/1515* | (2006.01) | |
| *C08K 5/37* | (2006.01) | |

(52) U.S. Cl.
CPC .............. *C08F 2/38* (2013.01); *C08F 212/08* (2013.01); *C08F 220/06* (2013.01); *C08K 3/04* (2013.01); *C08K 5/1515* (2013.01); *C08K 5/37* (2013.01); *C09D 11/326* (2013.01)

(58) Field of Classification Search
CPC ......... C08F 2/38; C08F 220/06; C09D 11/326
See application file for complete search history.

(56) References Cited

U.S. PATENT DOCUMENTS

| | | | | |
|---|---|---|---|---|
| 6,107,397 A | * | 8/2000 | Blankenburg | C08F 226/00 524/808 |
| 7,351,754 B2 | * | 4/2008 | Nakano | C09D 11/30 524/556 |
| 9,878,558 B2 | * | 1/2018 | Eguchi | C09D 11/107 |
| 10,968,358 B2 | * | 4/2021 | Kunii | C09D 125/14 |
| 2004/0059019 A1 | | 3/2004 | Nakano et al. | |
| 2009/0220693 A1 | | 9/2009 | Takemura et al. | |
| 2017/0152393 A1 | | 6/2017 | Matsumoto | |
| 2019/0300730 A1 | | 10/2019 | Kunii et al. | |

FOREIGN PATENT DOCUMENTS

| | | |
|---|---|---|
| CN | 1206013 A | 1/1999 |
| CN | 106471068 A | 3/2017 |
| EP | 1 422 276 A1 | 5/2004 |
| EP | 3 006 519 A1 | 4/2016 |
| JP | 2004-26988 A | 1/2004 |
| JP | 2004-210951 A | 7/2004 |
| JP | 2006-124557 A | 5/2006 |
| JP | 2006-176624 A | 7/2006 |
| JP | 2006-274141 A | 10/2006 |
| JP | 2007-314784 A | 12/2007 |
| JP | 2013-256667 A | 12/2013 |
| JP | 2016-160331 A | 9/2016 |
| JP | 2017-128723 A | 7/2017 |
| WO | WO 2017/013422 A1 | 1/2017 |
| WO | WO 2017/110997 A1 | 6/2017 |

OTHER PUBLICATIONS

International Search Report (PCT/ISA/210) issued in PCT/JP2018/024520, dated Aug. 14, 2018.
Extended European Search Report for European Application No. 18828747.8, dated Feb. 15, 2021.

* cited by examiner

*Primary Examiner* — Vu A Nguyen
(74) *Attorney, Agent, or Firm* — Birch, Stewart, Kolasch & Birch, LLP

(57) ABSTRACT

The present invention relates to [1] a process for producing a water-based pigment dispersion, including step 1 of subjecting an ionic group-containing monomer (a) and a hydrophobic monomer (b) to polymerization reaction using an ionic group-containing polymerization initiator (x) and an ionic group-containing chain transfer agent (y) to obtain an ionic group-containing polymer A, step 2 of mixing and dispersing the obtained polymer A and a pigment in an aqueous medium to obtain a pigment water dispersion, and step 3 of subjecting the polymer A in the obtained pigment water dispersion to crosslinking reaction with a polyfunctional compound to obtain the water-based pigment dispersion, and [2] a process for producing a water-based ink, including, in addition to the aforementioned steps 1 to 3, step 4 of mixing the obtained water-based pigment dispersion with an organic solvent to obtain the water-based ink. The resulting water-based pigment dispersion and water-based ink can exhibit excellent redispersibility and high flowability by which it is possible to suppress clogging of ink ejection nozzles owing to solidification of a pigment or a polymer in the ink ejection nozzles.

20 Claims, No Drawings

PRODUCTION METHOD FOR AQUEOUS PIGMENT DISPERSION

FIELD OF THE INVENTION

The present invention relates to a process for producing a water-based pigment dispersion and a water-based pigment dispersion produced by the process, and a process for producing a water-based ink and a water-based ink produced by the process.

BACKGROUND OF THE INVENTION

In ink-jet printing methods, droplets of ink are directly ejected from very fine nozzles and allowed to adhere to a printing medium to obtain a printed material having characters or images printed on the printing medium, etc. The ink-jet printing methods have become rapidly spread because of various advantages such as easiness of full coloration, low cost, capability of using a plain paper as the printing medium, non-contact with the printing medium, etc. In particular, from the viewpoint of attaining good weathering resistance and water resistance of the resulting printed material, the ink-jet printing methods using an ink containing a pigment as a colorant have become predominant.

The pigment used in the ink is dispersed in an ink vehicle using a dispersant such as a polymer. However, there arises such a problem that molecules of the pigment are incapable of being uniformly dissolved in the ink vehicle unlike dyes. For this reason, it has been required to improve storage stability of the ink for maintaining a good dispersed state of the pigment in the ink, and suppress deterioration in ejection properties of the ink owing to solidification of the polymer or pigment in portions of ink ejection nozzles which tends to be caused by a poor dispersed state of the pigment in the ink after allowing the ink to stand for a long period of time.

In order to improve the water dispersion and water-based ink for ink-jet printing, various methods for production thereof, etc., have been conventionally proposed.

For example, JP 2004-210951A (Patent Literature 1) discloses a process for producing a water-based ink that can be suitably used for ink-jet printing, which process includes the steps of dissolving a water-insoluble polymer containing an ionic group at a terminal end thereof in an organic solvent, adding a pigment, water and a neutralizing agent to the obtained solution, kneading the resulting dispersion, if required followed by diluting the dispersion with water, and removing the organic solvent by distillation from the dispersion.

JP 2006-176624A (Patent Literature 2) discloses a water dispersion for ink-jet printing which contains a water-insoluble polymer that has a weight-average molecular weight of 1000 to 15000, and contains a constitutional unit derived from a hydrophobic monomer in an amount of not less than 90% by weight and further ionic groups at both terminal ends thereof, and colorant.

JP 2007-314784A (Patent Literature 3) discloses a water dispersion for ink-jet printing which contains colorant-containing water-insoluble crosslinked polymer particles and a water-insoluble organic compound, in which the water-insoluble crosslinked polymer is a polymer obtained by crosslinking a water-insoluble polymer with a crosslinking agent, as well as a process for producing the water dispersion.

SUMMARY OF THE INVENTION

The present invention relates to a process for producing a water-based pigment dispersion which includes the following steps 1 to 3, and a process for producing a water-based ink which includes the following steps 1 to 4:

Step 1: subjecting an ionic group-containing monomer (a) and a hydrophobic monomer (b) to polymerization reaction using an ionic group-containing polymerization initiator (x) and an ionic group-containing chain transfer agent (y) to obtain an ionic group-containing polymer A;

Step 2: mixing and dispersing the polymer A obtained in the step 1 and a pigment in an aqueous medium to obtain a pigment water dispersion;

Step 3: subjecting the polymer A in the pigment water dispersion obtained in the step 2 to crosslinking reaction with a polyfunctional compound to obtain the water-based pigment dispersion; and Step 4: mixing the water-based pigment dispersion obtained in the step 3 with an organic solvent to obtain the water-based ink.

DETAILED DESCRIPTION OF THE INVENTION

In the technologies described in Patent Literatures 1 to 3, by stably dispersing the pigment with the polymer, it is possible to ensure good dispersion stability of the water dispersion or ejection reliability with time of the water-based ink to a certain extent. However, in the case where the ink is dried and solidified on its interface to surrounding air being present in an ejection port of respective ink-ejection nozzles, polymer films formed on the respective pigment particles tend to suffer from bonding or adhesion therebetween, so that the dried and solidified ink can be hardly redispersed and can be hardly flowed even when a fresh ink is supplied to the ejection nozzles. For this reason, in some cases, there tends to occur such a problem that the ink is deteriorated in ejection properties upon restarting the printing operation owing to occurrence of clogging of the ink ejection nozzles.

The present invention relates to a process for producing a water-based pigment dispersion which is capable of ensuring not only excellent redispersibility but also high flowability by which occurrence of clogging of ink ejection nozzles owing to solidification of a pigment or a polymer in the ink ejection nozzles can be suppressed, and a water-based pigment dispersion produced by the process, as well as a process for producing a water-based ink and a water-based ink produced by the process.

The present inventors have aimed at imparting good performance to a water-based pigment dispersion and a water-based ink such that the dispersion or ink, on one hand, can be maintained in a flowable state to exhibit excellent ejection properties under the environmental conditions in which an ink vehicle is still present, such as in the ink ejection nozzles, and on the other hand, can exhibit excellent redispersibility in the case where the ink deposited onto the nozzles is dried and solidified. As a result, the present inventors have found that the above conventional problems can be solved by dispersing a pigment with a polymer A that is obtained by subjecting an ionic group-containing monomer (a) and a hydrophobic monomer (b) to polymerization reaction using an ionic group-containing polymerization initiator (x) and an ionic group-containing chain transfer agent (y) and then subjecting the polymer A in the resulting dispersion to crosslinking reaction with a polyfunctional compound.

That is, the present invention relates to the following aspects [1] to [4]. [1] A process for producing a water-based pigment dispersion, including the following steps 1 to 3:

Step 1: subjecting an ionic group-containing monomer (a) and a hydrophobic monomer (b) to polymerization reaction using an ionic group-containing polymerization initiator (x) and an ionic group-containing chain transfer agent (y) to obtain an ionic group-containing polymer A;

Step 2: mixing and dispersing the polymer A obtained in the step 1 and a pigment in an aqueous medium to obtain a pigment water dispersion; and Step 3: subjecting the polymer A in the pigment water dispersion obtained in the step 2 to crosslinking reaction with a polyfunctional compound to obtain the water-based pigment dispersion.

[2] A water-based pigment dispersion that is produced by the process according to the above aspect [1].

[3] A process for producing a water-based ink, including the following steps 1 to 4:

Step 1: subjecting an ionic group-containing monomer (a) and a hydrophobic monomer (b) to polymerization reaction using an ionic group-containing polymerization initiator (x) and an ionic group-containing chain transfer agent (y) to obtain an ionic group-containing polymer A;

Step 2: mixing and dispersing the polymer A obtained in the step 1 and a pigment in an aqueous medium to obtain a pigment water dispersion;

Step 3: subjecting the polymer A in the pigment water dispersion obtained in the step 2 to crosslinking reaction with a polyfunctional compound to obtain a water-based pigment dispersion; and Step 4: mixing the water-based pigment dispersion obtained in the step 3 with an organic solvent to obtain the water-based ink.

[4] A water-based ink that is produced by the process according to the above aspect [3].

According to the present invention, it is possible to provide a process for producing a water-based pigment dispersion which is capable of ensuring excellent redispersibility and high flowability of the resulting dispersion or ink by which occurrence of clogging of ink ejection nozzles owing to solidification of a pigment or a polymer in the ink ejection nozzles can be suppressed, and a water-based pigment dispersion produced by the process, as well as a process for producing a water-based ink and a water-based ink produced by the process.

[Process for Producing Water-Based Pigment Dispersion]

The process for producing a water-based pigment dispersion according to the present invention includes the following steps 1 to 3:

Step 1: subjecting an ionic group-containing monomer (a) and a hydrophobic monomer (b) to polymerization reaction using an ionic group-containing polymerization initiator (x) and an ionic group-containing chain transfer agent (y) to obtain an ionic group-containing polymer A;

Step 2: mixing and dispersing the polymer dispersant obtained in the step 1 and a pigment in an aqueous medium to obtain a pigment water dispersion; and Step 3: subjecting the polymer A in the pigment water dispersion obtained in the step 2 to crosslinking reaction with a polyfunctional compound to obtain the water-based pigment dispersion.

Meanwhile, the term "ionic group" as used in the present specification means both of a functional group that is presently kept in an ionic state exhibiting an electric charge, and a functional group that presently exhibits no electric charge, but has a capability of being converted into ions when applying an external action thereto.

In addition, the term "water-based" as used in the present specification means that water has a largest content among components of a dispersing medium used for dispersing the pigment in the dispersion or ink. Also, the term "redispersibility" as used herein means a capability of re-dissolving or redispersing solid components such as pigment or polymer particles that are produced when volatilizing volatile components contained in an ink vehicle, in the dispersion or ink.

The water-based pigment dispersion according to the present invention serves for production of a good printed material that is excellent in storage stability, fixing properties and water resistance, and therefore can be suitably used as a water-based pigment dispersion for obtaining an ink for flexographic printing, an ink for gravure printing or an ink for ink-jet printing, in particular, is preferably used as a water-based pigment dispersion for obtaining an ink for ink-jet printing.

In addition, the water-based ink obtained from the water-based pigment dispersion according to the present invention can exhibit excellent redispersibility and flowability by which it is possible to suppress occurrence of clogging of ink ejection nozzles owing to solidification of a pigment or a polymer in the ink ejection nozzles when used in an ink-jet printing method, and is therefore preferably used as a water-based ink for ink-jet printing.

The water-based pigment dispersion and the water-based ink obtained according to the respective production processes of the present invention can exhibit excellent redispersibility and flowability, and are therefore capable of inhibiting occurrence of ejection defects owing to solidification of a pigment or a polymer in ink ejection nozzles. The reason why the water-based pigment dispersion and the water-based ink according to the present invention can exhibit excellent redispersibility and high flowability (low viscosity thereof when concentrated) is considered as follows though it is not clearly determined yet.

That is, the polymer A used in the present invention is produced by the polymerization reaction using the polymerization initiator and the chain transfer agent both containing an ionic group, and therefore the resulting polymer contains the ionic group not only at least one terminal end thereof, but also at both terminal ends thereof at a certain proportion. The terminal ends of the polymer tend to be exposed to a surface of the respective pigment particles owing to their high degree of freedom. Therefore, when using the polymer A containing an ionic group according to the present invention, the amount of the ionic groups exposed to the surface of the respective particles dispersed in the water-based pigment dispersion increases as compared to the case of using a polymer obtained by polymerization reaction using a polymerization initiator or chain transfer agent containing no ionic group. For this reason, the polymer A has many sites that are crosslinkable with the polyfunctional compound, and can also be formed into a crosslinked structure that is suitable for being dispersed in water. Therefore, the resulting particles have high affinity to water and can efficiently exhibit electric repulsion therebetween owing to the ionic groups of the polymer which have no contribution to the crosslinking reaction. As a result, it is considered that the resulting water-based pigment dispersion and water-based ink are excellent in redispersibility and have low viscosity even when concentrated.

In the following, the pigment and the polymer A used in the respective production processes of the present invention are described, followed by the detailed descriptions of the steps 1 to 3.

<Pigment>

The pigment used in the present invention may be either an inorganic pigment or an organic pigment, and a lake pigment or a fluorescent pigment may also be used in the present invention. In addition, these pigments may also be used in combination with an extender pigment, if required.

Specific examples of the inorganic pigment include carbon blacks, metal oxides such as titanium oxide, iron oxide, red iron oxide and chromium oxide, and iridescent nacreous pigments. In particular, the carbon blacks are preferably used for black inks. The carbon blacks may include furnace blacks, thermal lamp blacks, acetylene blacks and channel blacks.

Specific examples of the organic pigment include azo pigments such as azo lake pigments, insoluble monoazo pigments, insoluble disazo pigments and chelate azo pigments; and polycyclic pigments such as phthalocyanine pigments, perylene pigments, perinone pigments, anthraquinone pigments, quinacridone pigments, dioxazine pigments, thioindigo pigments, isoindolinone pigments, quinophthalone pigments, diketopyrrolopyrrole pigments, benzimidazolone pigments and threne pigments.

The hue of the organic pigment used in the present invention is not particularly limited, and there may be used any chromatic pigment having a yellow color, a magenta color, a cyan color, a blue color, a red color, an orange color, a green color, etc.

Specific examples of the preferred organic pigments include one or more pigments selected from the group consisting of commercially available products marketed under the names of C.I. Pigment Yellow, C.I. Pigment Red, C.I. Pigment Orange, C.I. Pigment Violet, C.I. Pigment Blue and C.I. Pigment Green, etc., with various part numbers.

Examples of the extender pigment include silica, calcium carbonate and talc.

The aforementioned pigments may be used alone or in the form of a mixture of any two or more thereof.

In the present invention, it is preferred that the pigment is first dispersed with the polymer A, and then contained in the form of polymer particles containing the pigment (hereinafter also referred to merely as "pigment-containing polymer particles") in the resulting dispersion or ink.

(Polymer A)

The polymer A used in the present invention has not only a function as a pigment dispersant exhibiting the effect of dispersing the pigment, but also a function as a fixing agent for fixing the resulting ink onto a printing medium.

The polymer A may be any suitable polymer as long as it contains an ionic group. Also, the polymer A may be either a water-soluble polymer or a water-insoluble polymer, and is preferably a water-insoluble polymer. From the viewpoint of ensuring excellent redispersibility and high flowability of the resulting water-based pigment dispersion and water-based ink, the ionic groups of the polymer A may be partially treated with a polyfunctional compound to form a crosslinked structure. By subjecting the polymer A to the crosslinking treatment, the polymer A may be formed into a "water-insoluble crosslinked polymer" even though the polymer A is in the form of a water-soluble polymer.

The terms "water-soluble" and "water-insoluble" as used herein have the following meanings. That is, in the case where when a polymer is dried to a constant weight at 105° C. for 2 hours and then dissolved in 100 g of water at 25° C. until reaching a saturation concentration thereof, the solubility in water of the polymer is more than 10 g, the polymer is regarded as being water-soluble, whereas in the case where the solubility in water of the polymer is not more than 10 g, the polymer is regarded as being water-insoluble. The solubility in water of the water-insoluble polymer is preferably not more than 5 g and more preferably not more than 1 g. In the case where the water-insoluble polymer is in the form of an anionic polymer, the solubility means a solubility in water of the water-insoluble polymer whose anionic groups are neutralized completely (i.e., 100%) with sodium hydroxide.

Examples of the configuration of the pigment and the polymer which are present in the water-based pigment dispersion and the water-based ink of the present invention include the configuration in which the water-insoluble crosslinked polymer is adsorbed onto the pigment, and the configuration in which the pigment is included in the water-insoluble crosslinked polymer. From the viewpoint of improving dispersion stability of the pigment as well as from the viewpoint of improving redispersibility and flowability of the water-based pigment dispersion and the water-based ink, the pigment and the polymer are preferably present in the form of polymer particles formed by incorporating the pigment in the water-insoluble crosslinked polymer (hereinafter also referred to merely as "pigment-containing crosslinked polymer particles"), and is more preferably present in the form of crosslinked polymer particles in which the pigment is enclosed (i.e., encapsulated) in the respective water-insoluble crosslinked polymer particles.

The acid value of the polymer A is attributed to the ionic groups, preferably carboxy groups, contained therein. The acid value of the polymer A is preferably not less than 150 mgKOH/g, more preferably not less than 180 mgKOH/g, even more preferably not less than 200 mgKOH/g and further even more preferably not less than 210 mgKOH/g, and is also preferably not more than 310 mgKOH/g, more preferably not more than 300 mgKOH/g, even more preferably not more than 290 mgKOH/g and further even more preferably not more than 280 mgKOH/g. When the acid value of the polymer A lies within the aforementioned range, the amounts of the ionic groups and the neutralized ionic groups in the polymer A are sufficient, and it is therefore possible to ensure good dispersion stability of the pigment in the resulting dispersion or ink. In addition, the acid value of the polymer A which lies within the aforementioned range is preferred from the viewpoint of attaining good balance between affinity of the polymer A to an aqueous medium and interaction of the polymer A with the pigment.

The acid value of the polymer (A) may be measured by the method described in Examples below, and may also be calculated from a mass ratio between the monomers constituting the polymer A.

The polymer A used in the present invention contains at least a constitutional unit derived from an ionic group-containing monomer (a) (hereinafter also referred to merely as an "ionic monomer" or a "component (a)") and a constitutional unit derived from a hydrophobic monomer (b) (hereinafter also referred to merely as a "component (b)") from the viewpoint of improving dispersion stability and storage stability of the water-based pigment dispersion and the water-based ink. The polymer A may be produced by copolymerizing a monomer mixture containing the component (a) and the component (b) (hereinafter also referred to merely as a "raw material monomer"). The polymer A may further contain a constitutional unit derived from a macromonomer (c) or a constitutional unit derived from a nonionic monomer (d).

[Ionic Group-Containing Monomer (a)]

Examples of the ionic group-containing monomer (a) (ionic monomer (a)) include anionic monomers and cationic monomers. Among these monomers, from the viewpoint of improving redispersibility and flowability of the water-based pigment dispersion and the water-based ink, preferred are anionic monomers, and more preferred are anionic vinyl monomers. Meanwhile, the ionic monomer may include those monomers that have no ionicity under neutral conditions, such as an acid, an amine compound and the like, but can be converted into ions under acid or alkaline conditions.

Examples of the anionic monomers include at least one monomer selected from the group consisting of unsaturated carboxylic acid monomers, unsaturated sulfonic acid monomers and unsaturated phosphoric acid monomers, etc.

Specific examples of the unsaturated carboxylic acid monomers include acrylic acid, methacrylic acid, crotonic acid, itaconic acid, maleic acid, fumaric acid, citraconic acid and 2-methacryloyloxymethylsuccinic acid.

Specific examples of the unsaturated sulfonic acid monomers include styrenesulfonic acid, 2-acrylamido-2-methyl-propanesulfonic acid and 3-sulfopropyl (meth)acrylate.

Specific examples of the unsaturated phosphoric acid monomers include vinylphosphonic acid, vinyl phosphate, bis(methacryloxyethyl)phosphate, diphenyl-2-acryloyloxyethyl phosphate and diphenyl-2-methacryloyloxyethyl phosphate.

Among the aforementioned anionic monomers, from the viewpoint of improving redispersibility and flowability of the water-based pigment dispersion and the water-based ink, preferred are the unsaturated carboxylic acid monomers, more preferred are acrylic acid and methacrylic acid, and even more preferred is acrylic acid.

Meanwhile, the term "(meth)acrylate" as used herein means at least one compound selected from the group consisting of a methacrylate and an acrylate, and is hereinafter defined in the same way.

Examples of the cationic monomers include at least one monomer selected from the group consisting of unsaturated tertiary amine-containing monomers and unsaturated ammonium salt-containing monomers, etc.

Specific examples of the unsaturated tertiary amine-containing monomers include N,N-dimethylaminoethyl (meth)acrylate, N,N-dimethylaminopropyl (meth)acrylate, N,N-diethylaminoethyl (meth)acrylate, N,N-dimethylaminopropyl (meth)acrylamide, N,N-dimethylarylamines, vinyl pyrrolidone, 2-vinyl pyridine, 4-vinyl pyridine, 2-methyl-6-vinyl pyridine and 5-ethyl-2-vinyl pyridine.

Specific examples of the unsaturated ammonium salt-containing monomers include a quaternarized product of N,N-dimethylaminoethyl (meth)acrylate, a quaternarized product of N,N-diethylaminoethyl (meth)acrylate and a quaternarized product of N,N-dimethylaminopropyl (meth)acrylate.

Of these cationic monomers, preferred are N,N-dimethylaminoethyl (meth)acrylate, N,N-dimethylaminopropyl (meth)acrylamide and vinyl pyrrolidone.

[Hydrophobic Monomer (b)]

The hydrophobic monomer (b) is preferably used as a monomer component of the polymer A from the viewpoint of improving dispersion stability and storage stability of the water-based pigment dispersion and the water-based ink.

The hydrophobic monomer is preferably a hydrophobic vinyl monomer. Examples the hydrophobic monomer include an alkyl (meth)acrylate and an aromatic group-containing monomer which contain an alkyl group having not less than 1 and not more than 30 carbon atoms and an aryl group having not less than 6 and not more than 30 carbon atoms, respectively.

From the viewpoint of improving redispersibility and flowability of the water-based pigment dispersion and the water-based ink, the alkyl (meth)acrylate includes those alkyl (meth)acrylates containing an alkyl group having preferably 1 to 22 carbon atoms and more preferably 6 to 18 carbon atoms. Examples of the alkyl (meth)acrylate include methyl (meth)acrylate, ethyl (meth)acrylate, propyl (meth)acrylate, butyl (meth)acrylate, amyl (meth)acrylate, cyclohexyl (meth)acrylate, 2-ethylhexyl (meth)acrylate, octyl (meth)acrylate, decyl (meth)acrylate, dodecyl (meth)acrylate, stearyl (meth)acrylate, isopropyl (meth)acrylate, isobutyl (meth)acrylate, tert-butyl (meth)acrylate, isoamyl (meth)acrylate, isooctyl (meth)acrylate, isodecyl (meth)acrylate, isododecyl (meth)acrylate and isostearyl (meth)acrylate.

Meanwhile, the term "(meth)acrylate" as used herein means at least one compound selected from the group consisting of an acrylate and a methacrylate, and the term "(meth)" described hereinafter has the same meaning as defined above.

The aromatic group-containing monomer is preferably a vinyl monomer containing an aromatic group having 6 to 22 carbon atoms which may also contain a substituent group containing a hetero atom. From the viewpoint of improving redispersibility and flowability of the water-based pigment dispersion and the water-based ink, the aromatic group-containing monomer is more preferably a styrene-based monomer or an aromatic group-containing (meth)acrylate.

Specific examples of the styrene-based monomer include styrene, 2-methyl styrene, vinyl toluene, divinyl benzene and chlorostyrene. Specific examples of the aromatic group-containing (meth)acrylate include phenyl (meth)acrylate, benzyl (meth)acrylate and phenoxyethyl (meth)acrylate.

As the hydrophobic monomer (b), any two or more kinds of the aforementioned monomers may be used, and the styrene-based monomer and the aromatic group-containing (meth)acrylate may also be used in combination with each other.

Among these hydrophobic monomers (b), preferred is the styrene-based monomer, and more preferred are styrene and 2-methyl styrene.

[Macromonomer (c)]

The macromonomer (c) is in the form of a compound containing a polymerizable functional group at one terminal end thereof and having a number-average molecular weight of not less than 500 and not more than 100,000, and may be used as a monomer component of the polymer A.

The polymerizable functional group bonded to one terminal end of the macromonomer is preferably an acryloyloxy group or a methacryloyloxy group and more preferably a methacryloyloxy group.

As the macromonomer (c), preferred are an aromatic group-containing monomer-based macromonomer and a silicone-based macromonomer, and more preferred is an aromatic group-containing monomer-based macromonomer. Examples of an aromatic group-containing monomer constituting the aromatic group-containing monomer-based macromonomer include the same aromatic group-containing monomers as described above with respect to the hydrophobic monomer (b). Among these aromatic group-containing monomers, preferred are styrene and benzyl (meth)acrylate, and more preferred is styrene.

Specific examples of the styrene-based macromonomer include "AS-6(S)", "AN-6(S)" and "HS-6(S)" (tradenames) all available from Toagosei Co., Ltd., etc.

[Nonionic Monomer (d)]

From the viewpoint of improving dispersion stability of the water-based pigment dispersion and the water-based ink, the polymer A may further contain a nonionic monomer (d) as a monomer component thereof.

Examples of the nonionic monomer (d) include 2-hydroxyethyl (meth)acrylate, 3-hydroxypropyl (meth)acrylate, a polyalkylene glycol (meth)acrylate such as polypropylene glycol (n=2 to 30 wherein n represents an average molar number of addition of oxyalkylene groups: hereinafter defined in the same way) (meth)acrylate and polyethylene glycol (n=2 to 30) (meth)acrylate, an alkoxy polyalkylene glycol (meth)acrylate such as methoxy polyethylene glycol (n=1 to 30) (meth)acrylate, and phenoxy (ethylene glycol/propylene glycol copolymer) (n=1 to 30 in which n for ethylene glycol is 1 to 29) (meth)acrylate. Among these nonionic monomers, preferred are polypropylene glycol (n=2 to 30) (meth)acrylate and phenoxy (ethylene glycol/propylene glycol copolymer) (meth)acrylate, more preferred is polypropylene glycol (n=2 to 30) (meth)acrylate.

Specific examples of commercially available products of the nonionic monomer (d) include "NK ESTER M-20G", "NK ESTER M-40G", "NK ESTER M-90G", "NK ESTER M-230G" and the like all available from Shin-Nakamura Chemical Co., Ltd.; and "BLEMMER PE-90", "BLEMMER PE-200", "BLEMMER PE-350" and the like, "BLEMMER PME-100", "BLEMMER PME-200", "BLEMMER PME-400" and the like, "BLEMMER PP-500", "BLEMMER PP-800", "BLEMMER PP-1000" and the like, "BLEMMER AP-150", "BLEMMER AP-400", "BLEMMER AP-550" and the like, and "BLEMMER 50PEP-300", "BLEMMER 50POEP-800B", "BLEMMER 43PAPE-600B" and the like, all available from NOF Corporation.

The aforementioned monomer components may be respectively used alone or in the form of a mixture of any two or more thereof.

As described above, the ionic group-containing polymer A used in the present invention is preferably a vinyl-based polymer containing a constitutional unit derived from at least one ionic group-containing monomer (a) selected from the group consisting of acrylic acid and methacrylic acid and a constitutional unit derived from at least one hydrophobic monomer (b) selected from the group consisting of an alkyl (meth)acrylate and an aromatic group-containing monomer, and more preferably a vinyl-based polymer containing a constitutional unit derived from acrylic acid and a constitutional unit derived from an aromatic group-containing monomer.

(Contents of Respective Components in Raw Material Monomer or Contents of Respective Constitutional Units in Polymer A)

The contents of the aforementioned components (a) and (b) in the raw material monomer (contents of non-neutralized components; hereinafter defined in the same way) upon production of the polymer A, or the contents of the constitutional units derived from the components (a) and (b) in the polymer A are as follows, from the viewpoint of improving dispersion stability of the water-based pigment dispersion and the water-based ink.

The content of the component (a) is preferably not less than 10% by mass, more preferably not less than 15% by mass and even more preferably not less than 20% by mass, and is also preferably not more than 70% by mass, more preferably not more than 60% by mass, even more preferably not more than 50% by mass and further even more preferably not more than 45% by mass.

The content of the component (b) is preferably not less than 30% by mass, more preferably not less than 40% by mass, even more preferably not less than 50% by mass and further even more preferably not less than 55% by mass, and is also preferably not more than 90% by mass, more preferably not more than 85% by mass and even more preferably not more than 80% by mass.

The mass ratio of the component (a) to the component (b) [component (a)/component (b)] is preferably not less than 0.1, more preferably not less than 0.15, even more preferably not less than 0.2 and further even more preferably not less than 0.25, and is also preferably not more than 2.3, more preferably not more than 1.8, even more preferably not more than 1.2, further even more preferably not more than 1, still further even more preferably not more than 0.8 and furthermore preferably not more than 0.6.

<Step 1>

The step 1 is the step of subjecting the ionic group-containing monomer (a) and the hydrophobic monomer (b) to polymerization reaction using an ionic group-containing polymerization initiator (x) and an ionic group-containing chain transfer agent (y) to obtain the ionic group-containing polymer A.

The ionic group-containing polymer A may be produced by copolymerizing the aforementioned raw material monomer by conventionally known polymerization methods such as a bulk polymerization method, a solution polymerization method, a suspension polymerization method and an emulsion polymerization method. Among these polymerization methods, preferred is the solution polymerization method.

The solvent used in the solution polymerization method is not particularly limited, and is preferably an organic polar solvent. The organic polar solvent that is miscible with water may be used in the form of a mixture with water. Examples of the organic polar solvents include aliphatic alcohols having 1 to 3 carbon atoms; ketones having 3 to 8 carbon atoms; ethers; and esters such as ethyl acetate. Among these organic polar solvents, preferred are ketones having 4 to 8 carbon atoms and a mixed solvent of any of the ketones with water, and more preferred are methyl ethyl ketone, methyl isobutyl ketone and a mixed solvent of methyl ethyl ketone or methyl isobutyl ketone with water.

The polymerization reaction is conducted in the presence of the ionic group-containing polymerization initiator (x) and the ionic group-containing chain transfer agent (y).

Examples of the ionic group include an anionic group, a cationic group and a betainic group. These ionic groups may be used alone or in combination of any two or more different kinds thereof.

Specific examples of the anionic group include a —COOM group (wherein M is a hydrogen atom or an alkali metal atom; hereinafter defined in the same way), a —$SO_3M$ group, a —$PO_3M$ group, etc. These anionic groups may be used alone or in combination of any two or more thereof.

Specific examples of the cationic group include an amine salt group represented by the formula of —$NH_nR_{2-n}$ (wherein n is an integer of 0 to 2, and R groups are each independently an alkyl group or an aryl group; hereinafter defined in the same way), a pyridinium salt group, an imidazolinium salt group, a phosphine group represented by the formula of —$PR_2$, etc. The alkyl group as R in the aforementioned formulae is preferably an alkyl group having 1 to 8 carbon atoms. Also, the aryl group as R in the aforementioned formulae is preferably an aryl group having 6 to 12 carbon atoms. These cationic groups may be used alone or in combination of any two or more thereof.

Specific examples of the betainic group include a carbobetaine group, a sulfobetaine group and a phosphobetaine group, for example, those groups containing an amino group and a carboxy group in a molecule thereof, such as groups contained in an amino acid. These betainic groups may be used alone or in combination of any two or more thereof.

Among these groups, from the viewpoint of improving redispersibility and flowability of the water-based pigment dispersion and the water-based ink, preferred are those groups containing a carboxy group in a molecule thereof.

In addition, the type of a polymerization chain of the monomer polymerized is not particularly limited, and may be of any of a random type, a block type and a graft type, etc.

(Ionic Group-Containing Polymerization Initiator (x))

Examples of the ionic group-containing polymerization initiator (x) include polymerization initiators containing a cationic group such as an amino group, an imidazoline group and a pyridine group, polymerization initiators containing a anionic group such as a carboxy group, and the like. Among these polymerization initiators, from the viewpoint of well crosslinking the resulting polymer with the polyfunctional compound, preferred are those polymerization initiators containing a anionic group.

Specific examples of the ionic group-containing polymerization initiator (x) include 2,2'-azobis(2-amidinopropane) dibasic acid, 4,4'-azobis(4-cyanovaleric acid), 2,2'-azobis[2-(5-methyl-2-imidazolin-2-yl)propane] dihydrochloride, 2,2'-azobis[2-(2-imidazolin-2-yl)propane] dihydrochloride, 2,2'-azobis[2-(2-imidazolin-2-yl)propane] disulfate dihydrate, 2,2'-azobis[2-(3,4,5,6-tetrahydropyridin-2-yl)propane] dihydrochloride, 2,2'-azobis[2-(1-(2-hydroxyethyl)-2-yl)propane] dihydrochloride, 2,2'-azobis(2-methyl propionamidine) dihydrochloride, 2,2'-azobis[N-(2-carboxyethyl)-2-methyl propionamide], etc. These ionic group-containing polymerization initiators may be used alone or in combination of any two or more thereof.

Among these ionic group-containing polymerization initiators, preferred is at least one compound selected from the group consisting of 4,4'-azobis(4-cyanovaleric acid) and 2,2'-azobis[N-(2-carboxyethyl)-2-methyl propionamide].

The amount of the ionic group-containing polymerization initiator (x) used is preferably not less than 0.001 mol, more preferably not less than 0.002 mol and even more preferably not less than 0.003 mol per 1 mol of the raw material monomer, and is also preferably not more than 1 mol, more preferably not more than 0.5 mol and even more preferably not more than 0.1 mol per 1 mol of the raw material monomer.

(Ionic Group-Containing Chain Transfer Agent (y))

The ionic group-containing chain transfer agent (y) used herein is not particularly limited as long as it contains an ionic group that is capable of inducing chain transfer polymerization. Examples of the ionic group-containing chain transfer agent (y) include chain transfer agents containing an anionic group such as a carboxy group, chain transfer agents containing a cationic group such as an amino group, an imidazoline group and a pyridine group, and chain transfer agents containing an ampholytic group such as a betaine. Among these ionic group-containing chain transfer agents, from the viewpoint of well crosslinking the resulting polymer with the polyfunctional compound, preferred are the chain transfer agents containing an anionic group.

The number of the ionic groups in the ionic group-containing chain transfer agent (y) is not particularly limited, and may be not less than 2.

Specific examples of the chain transfer agents containing an anionic group include 2-mercaptopropionic acid, 3-mercaptopropionic acid, mercaptosuccinic acid, thioglycolic acid, thiolactic acid, 4,4'-dithiobutyric acid, 3,3'-dithiopropionic acid and dithioglycolic acid. Among these anionic group-containing chain transfer agents, preferred is at least one compound selected from the group consisting of 2-mercaptopropionic acid, 3-mercaptopropionic acid, mercaptosuccinic acid and thioglycolic acid, and more preferred is 3-mercaptopropionic acid.

Specific examples of the chain transfer agents containing a cationic group include 1-amino-2-methyl-2-prop anethiol, 2-aminoethanethiol, 2-diethylaminoethanethiol, 2-dimethylaminoethanethiol, 4-aminothiophenol, dithiodianiline, 3,4,5,6-tetrahydro-2-pyrimidinethiol and 2-mercaptothiazoline. In addition, specific examples of the chain transfer agents containing an ampholytic group include thiol group-containing amino acids or derivatives thereof, such as DL-penicillamine, N-(2-mercaptopropionyl) glycine, DL-cysteine, DL-homocysteine, cystamine and DL-cystine.

The ionic group-containing chain transfer agent (y) may also contain a functional group capable of causing chain transfer polymerization, such as a mercapto group and a disulfide group. These groups may be used alone or in combination of any two or more thereof.

The amount of the ionic group-containing chain transfer agent (y) used is preferably not less than 0.001 mol, more preferably not less than 0.005 mol and even more preferably not less than 0.01 mol per 1 mol of the raw material monomer, and is also preferably not more than 0.5 mol, more preferably not more than 0.1 mol and even more preferably not more than 0.05 mol per 1 mol of the raw material monomer.

(Polymerization Conditions, etc.)

The preferred polymerization conditions may vary depending upon the kinds of polymerization initiator (x), chain transfer agent (y), raw material monomer and solvent used, etc. In general, the polymerization temperature is preferably not lower than 40° C., more preferably not lower than 50° C. and even more preferably not lower than 60° C., and is also preferably not higher than 95° C., more preferably not higher than 90° C. and even more preferably not higher than 80° C. The polymerization time is correlated with the polymerization temperature, and therefore cannot be determined indiscriminately. However, the polymerization time is preferably not less than 1 hour and more preferably not less than 2 hours, and is also preferably not more than 20 hours and more preferably not more than 10 hours. Furthermore, the polymerization is preferably conducted in a nitrogen gas atmosphere or an atmosphere of an inert gas such as argon.

After completion of the polymerization reaction, the polymer produced may be isolated from the obtained reaction solution by conventionally known methods such as reprecipitation and removal of the solvent by distillation. In addition, the resulting polymer may be purified by removing the unreacted monomers, etc., from the reaction solution by reprecipitation, membrane separation, chromatography, extraction, etc.

The solid content of the resulting polymer solution is preferably not less than 30% by mass and more preferably not less than 40% by mass, and is also preferably not more than 70% by mass and more preferably not more than 65% by mass, from the viewpoint of enhancing productivity of the pigment water dispersion containing the pigment-containing polymer particles.

Meanwhile, the solid content of the polymer solution may be measured by the method described in Examples below.

The weight-average molecular weight of the polymer A used in the present invention is preferably not less than 6,000, more preferably not less than 8,000 and even more preferably not less than 9,000, and is also preferably not more than 50,000, more preferably not more than 30,000 and even more preferably not more than 20,000. When the weight-average molecular weight of the polymer A lies within the aforementioned range, the polymer A has sufficient adsorption to the pigment, and the resulting dispersion can exhibit good dispersion stability.

Meanwhile, the weight-average molecular weight may be measured by the method described in Examples below.
<Step 2>

The step 2 is the step of mixing the polymer A obtained in the step 1 and the pigment in an aqueous medium and then dispersing the resulting mixture (hereinafter also referred to as a "pigment mixture") to obtain a pigment water dispersion.

In the step 2, it is preferred that the polymer A is dispersed in an aqueous medium such as water, and then the pigment is added, if required together with a neutralizing agent, a surfactant and the like, to the resulting dispersion, followed by mixing and dispersing the obtained mixture, thereby obtaining the pigment water dispersion containing the pigment-containing polymer particles.

Meanwhile, the term "aqueous medium" as used herein means a medium for dispersing the pigment in which water has a largest content among components contained in the medium. The aqueous medium may also contain an organic solvent.

(Neutralization)

The ionic groups, preferably carboxyl groups, contained in the polymer A are preferably at least partially neutralized using a neutralizing agent. When neutralizing the ionic groups contained in the polymer A, the pH value of the polymer A neutralized is preferably controlled to not less than 7 and not more than 11.

The neutralizing agent is preferably an alkali metal hydroxide. The use of the alkali metal hydroxide as the neutralizing agent is preferable, because the neutralized polymer can exhibit a large electric repulsion force, so that the resulting water-based pigment dispersion or water-based ink can be prevented from suffering from increase in viscosity and flocculation upon storage thereof, and further can be improved in fixing properties, etc.

Examples of the alkali metal hydroxide include lithium hydroxide, sodium hydroxide, potassium hydroxide and cesium hydroxide. Of these alkali metal hydroxides, preferred are sodium hydroxide and potassium hydroxide. Also, the polymer A may be previously neutralized.

The neutralizing agent is preferably used in the form of an aqueous neutralizing agent solution from the viewpoint of sufficiently and uniformly accelerating the neutralization. From the same viewpoint as described above, the concentration of the aqueous neutralizing agent solution is preferably not less than 3% by mass, more preferably not less than 10% by mass and even more preferably not less than 15% by mass, and is also preferably not more than 50% by mass and more preferably not more than 25% by mass.

The degree of neutralization of the ionic groups of the polymer A is preferably not less than 10 mol %, more preferably not less than 15 mol %, even more preferably not less than 20 mol % and further even more preferably not less than 25 mol %, and is also preferably not more than 60 mol %, more preferably not more than 55 mol %, even more preferably not more than 50 mol % and further even more preferably not more than 45 mol %, from the viewpoint of improving water resistance, storage stability, fixing properties, etc., of the resulting water-based pigment dispersion and water-based ink.

The degree of neutralization as used herein means the value calculated by dividing a mole equivalent number of the neutralizing agent by a mole equivalent number of the ionic groups of the polymer, i.e., the value of [(mole equivalent number of neutralizing agent)/(mole equivalent number of ionic groups of polymer)]. The degree of neutralization basically does not exceed 100 mol %. However, since the degree of neutralization as defined in the present invention is calculated from the mole equivalent number of the neutralizing agent, the degree of neutralization will exceed 100 mol % if the neutralizing agent is used in an excessively large amount.

(Contents of Respective Components in Pigment Mixture)

The contents of the respective components in the pigment mixture during the dispersion treatment are as follows from the viewpoint of improving dispersion stability, fixing properties and ejection properties of the resulting water-based pigment dispersion.

The content of the pigment in the pigment mixture is preferably not less than 5% by mass, more preferably not less than 10% by mass and even more preferably not less than 12.5% by mass, and is also preferably not more than 35% by mass, more preferably not more than 30% by mass and even more preferably not more than 20% by mass.

The content of the polymer A in the pigment mixture is preferably not less than 1% by mass, more preferably not less than 2% by mass and even more preferably not less than 3% by mass, and is also preferably not more than 9% by mass, more preferably not more than 8% by mass and even more preferably not more than 7% by mass.

The content of the organic solvent in the pigment mixture is preferably not more than 20% by mass, more preferably not more than 10% by mass and even more preferably not more than 5% by mass.

The content of water in the pigment mixture is preferably not less than 40% by mass, more preferably not less than 45% by mass and even more preferably not less than 50% by mass, and is also preferably not more than 85% by mass, more preferably not more than 80% by mass and even more preferably not more than 75% by mass.

The mass ratio of the pigment to the polymer A [pigment/polymer A] in the pigment mixture is preferably not less than 40/60, more preferably not less than 50/50 and even more preferably not less than 60/40, and is also preferably not more than 90/10, more preferably not more than 85/25 and even more preferably not more than 80/20, from the viewpoint of improving water resistance, storage stability, fixing properties, etc., of the resulting water-based pigment dispersion.

(Dispersion Treatment of Pigment Mixture)

In the step 2, the pigment mixture is subjected to dispersion treatment to obtain a pigment water dispersion containing the pigment-containing polymer particles. The dispersing method for obtaining the above pigment water dispersion is not particularly limited. The pigment particles may be atomized into fine particles having a desired average particle size only by subjecting the pigment mixture to substantial dispersion treatment. However, it is preferred that the pigment mixture is first subjected to preliminary dispersion treatment, and then further subjected to the substantial dispersion treatment by applying a shear stress thereto so as to control the average particle size of the obtained pigment-containing polymer particles to a desired value.

The temperature used in the step 2, in particular, the temperature used in the preliminary dispersion treatment in the step 2, is preferably not lower than 0° C., and is also preferably not higher than 40° C., more preferably not higher than 30° C. and even more preferably not higher than 25° C. The dispersing time is preferably not less than 0.5 hour and more preferably not less than 0.8 hour, and is also preferably not more than 30 hours, more preferably not more than 10 hours and even more preferably not more than 5 hours.

When subjecting the pigment mixture to the preliminary dispersion treatment, there may be used ordinary mixing and stirring devices such as anchor blades and disper blades. Of these devices, preferred are high-speed stirring mixers.

As a means for applying a shear stress to the pigment mixture in the substantial dispersion treatment, there may be used, for example, kneading machines such as roll mills and kneaders, high-pressure homogenizers such as "MICRO-FLUIDIZER" available from Microfluidics Corporation, and media-type dispersers such as paint shakers and beads mills. Examples of the commercially available media-type dispersers include "Ultra Apex Mill" available from Kotobuki Industries Co., Ltd., and "Pico Mill" available from Asada Iron Works Co., Ltd. These devices may be used in combination of any two or more thereof. Among these devices, the high-pressure homogenizers are preferably used from the viewpoint of reducing a particle size of the pigment.

In the case where the substantial dispersion treatment is conducted using the high-pressure homogenizer, the particle size of the pigment can be adjusted to a desired value by controlling the treating pressure and the number of passes through the homogenizer used in the substantial dispersion treatment.

The treating pressure used in the substantial dispersion treatment is preferably not less than 60 MPa, more preferably not less than 100 MPa and even more preferably not less than 130 MPa, and is also preferably not more than 200 MPa and more preferably not more than 180 MPa, from the viewpoint of enhancing productivity and cost efficiency.

In addition, the number of passes through the homogenizer used in the substantial dispersion treatment is preferably not less than 3 and more preferably not less than 7, and is also preferably not more than 30 and more preferably not more than 25.

In the case where the pigment water dispersion obtained in the step 2 contains an organic solvent, by removing the organic solvent from the dispersion by any conventionally known methods, it is possible to obtain the pigment water dispersion containing the pigment-containing polymer particles. The organic solvent is preferably substantially completely removed from the thus obtained pigment water dispersion. However, the residual organic solvent may be present in the pigment water dispersion unless the objects and effects of the present invention are adversely affected by the residual organic solvent. The content of the residual organic solvent in the pigment water dispersion is preferably not more than 0.1% by mass and more preferably not more than 0.01% by mass.

The concentration of non-volatile components in the resulting pigment water dispersion (solid content of the pigment water dispersion) is preferably not less than 10% by mass and more preferably not less than 15% by mass, and is also preferably not more than 30% by mass and more preferably not more than 25% by mass, from the viewpoint of improving dispersion stability of the pigment water dispersion as well as from the viewpoint of facilitating preparation of the water-based ink.

Meanwhile, the solid content of the pigment water dispersion may be measured by the method described in Examples below.

The average particle size of the pigment-containing polymer particles in the pigment water dispersion is preferably not less than 50 nm, more preferably not less than 60 nm and even more preferably not less than 70 nm, and is also preferably not more than 200 nm, more preferably not more than 160 nm and even more preferably not more than 150 nm, from the viewpoint of suppressing formation of coarse particles and improving ejection stability of the resulting water-based ink.

Meanwhile, the average particle size of the pigment-containing polymer particles may be measured by the method described in Examples below.

The average particle size of the pigment-containing polymer particles in the water-based ink is the same as the average particle size of the particles in pigment water dispersion, and the preferred ranges of the average particle size of the pigment-containing polymer particles in the water-based ink are also the same as those of the average particle size of the particles in pigment water dispersion.

As described hereinbefore, the mass ratio of the pigment to the polymer [pigment/polymer] in the pigment-containing polymer particles contained in the pigment water dispersion obtained in the step 2 is preferably not less than 40/60, more preferably not less than 50/50 and even more preferably not less than 60/40, and is also preferably not more than 90/10, more preferably not more than 85/25 and even more preferably not more than 80/20.

<Step 3>

The step 3 is the step of subjecting the polymer A in the pigment water dispersion obtained in the step 2 to crosslinking reaction with the polyfunctional compound to obtain the water-based pigment dispersion.

In the step 3, a part of the ionic groups, preferably carboxy groups, contained in the polymer A constituting the pigment-containing polymer particles are subjected to crosslinking reaction to form a crosslinked structure of the polymer in a surface layer portion of the respective pigment-containing polymer particles. In the above reaction, the polymer that is contained in the pigment-containing polymer particles dispersed in the pigment water dispersion is crosslinked with the polyfunctional compound (crosslinking agent) and formed into the water-insoluble crosslinked polymer, thereby obtaining the water-based pigment dispersion in which the pigment-containing crosslinked polymer particles formed by incorporating the pigment in the water-insoluble crosslinked polymer are dispersed in an aqueous medium.

<Polyfunctional Compound>

The polyfunctional compound used in the present invention is preferably in the form of a water-insoluble polyfunctional compound from the viewpoint of allowing the polyfunctional compound to efficiently react with the carboxy groups contained in the polymer in the medium containing water as a main component. The term "water-insoluble" as used herein with respect to the polyfunctional compound means that the solubility in water of the polyfunctional compound as measured by dissolving the polyfunctional compound in 100 g of ion-exchanged water at 25° C. until reaching a saturation concentration thereof is less than 50 g. The solubility in water of the polyfunctional compound is preferably not more than 40 g and more preferably not more than 35 g.

In addition, from the viewpoint of improving a crosslinking efficiency of the polymer, the water solubility rate (% by mass) of the polyfunctional compound is preferably not more than 50% by mass, more preferably not more than 40% by mass and even more preferably not more than 35% by mass. The "water solubility rate (% by mass)" as used herein means a rate (% by mass) of dissolution of the polyfunctional compound as measured by dissolving 10 parts by mass of the polyfunctional compound in 90 parts by mass of water at room temperature (25° C.). More specifically, the water solubility rate may be measured by the method described in Examples below.

The reactive functional group of the polyfunctional compound is preferably a group that is capable of reacting with a functional group of the polymer A to form a covalent bond therebetween. As the covalent bond between the reactive functional group of the polyfunctional compound and the functional group of the polymer A, preferred is at least one bond selected from the group consisting of an ester bond, a thioester bond, an amide bond, an amino bond, an ether bond, a thioether bond, a carbonyl bond, a thiocarbonyl bond and a sulfonyl bond, and more preferred is at least one bond selected from the group consisting of an ester bond, a thioester bond and an amide bond.

It is preferred that the polymer A contains a carboxy group, because the carboxy group undergoes irreversible addition reaction with a high yield by a thermal reaction with an epoxy group, an isocyanate group, an aziridino group, an amino group and an oxazoline group to thereby form a covalent bond therebetween. In the case where the polyfunctional compound contains a plurality of reactive functional groups, the reactive functional groups are preferably identical in kinds to each other from the viewpoint of conducting crosslinking reaction thereof with the polymer A under the same conditions.

The reactive functional group of the polyfunctional compound is not particularly limited to the aforementioned groups. However, in the case where the polymer A contains a carboxy group, from the same viewpoint as described above, the reactive functional group of the polyfunctional compound is preferably at least one group selected from the group consisting of an epoxy group, an isocyanate group, an aziridino group, an amino group and an oxazoline group, and more preferably an epoxy group. Meanwhile, the concept of the epoxy group as used herein also includes a glycidyl group.

The molecular weight of the polyfunctional compound is preferably not less than 120, more preferably not less than 150 and even more preferably not less than 200, and is also preferably not more than 2000, more preferably not more than 1500, even more preferably not more than 1000 and further even more preferably not more than 900, from the viewpoint of facilitating the crosslinking reaction and improving crosslinking efficiency of the polymer.

The polyfunctional compound containing an epoxy group(s), i.e., the polyfunctional epoxy compound, is preferably a compound containing two or more epoxy groups in a molecule thereof, more preferably a glycidyl ether group-containing compound, and even more preferably a glycidyl ether compound of a polyhydric alcohol containing a hydrocarbon group having not less than 3 and not more than 8 carbon atoms, from the viewpoint of improving crosslinking efficiency of the polymer.

The molecular weight of the polyfunctional epoxy compound is preferably not less than 120, more preferably not less than 150 and even more preferably not less than 200, and is also preferably not more than 2000, more preferably not more than 1500 and even more preferably not more than 1000, from the viewpoint of facilitating the crosslinking reaction and improving crosslinking efficiency of the polymer.

The number of epoxy groups contained in the polyfunctional epoxy compound is not less than 2 and preferably not less than 3 per one molecule of the compound, and is also preferably not more than 6 per one molecule of the compound, from the viewpoint of allowing the polyfunctional epoxy compound to efficiently react with the carboxy groups of the polymer to enhance storage stability, etc., of the pigment-containing polymer particles, and more preferably not more than 4 per one molecule of the compound from the viewpoint of attaining good market availability.

From the same viewpoint as described above, the epoxy equivalent of the polyfunctional epoxy compound is preferably not less than 100, more preferably not less than 110 and even more preferably not less than 120, and is also preferably not more than 300, more preferably not more than 270 and even more preferably not more than 250.

Specific examples of the polyfunctional epoxy compound include polyglycidyl ethers such as polypropylene glycol diglycidyl ether (water solubility rate: 31% by mass), glycerol polyglycidyl ether, polyglycerol polyglycidyl ether, trimethylol propane polyglycidyl ether (water solubility rate: 27% by mass), sorbitol polyglycidyl ether, pentaerythritol polyglycidyl ether, resorcinol diglycidyl ether, neopentyl glycol diglycidyl ether and hydrogenated bisphenol A-type diglycidyl ethers.

Of these polyfunctional epoxy compounds, preferred is at least one compound selected from the group consisting of polypropylene glycol diglycidyl ether (water solubility rate: 31% by mass), trimethylolpropane polyglycidyl ether (water solubility rate: 27% by mass) and pentaerythritol polyglycidyl ether (water solubility rate: less than 20% by mass).

(Crosslinking Treatment)

In the present invention, it is preferred that upon conducting the crosslinking reaction, the polymer A is in the form of a carboxy group-containing polymer, the carboxy groups of the polymer A is at least partially neutralized, and at least one of the following conditions 1 and 2 is satisfied.

[Condition 1]

The condition 1 is such a requirement that a value calculated according to the formula:

[(neutralization degree)/100]×[acid value of carboxy group-containing polymer], is not less than 50 mgKOH/g and not more than 200 mgKOH/g.

The value of the condition 1 represents an amount of the carboxy groups neutralized which are contained in the polymer.

The value of the condition 1 is preferably not less than 50 mgKOH/g, more preferably not less than 60 mgKOH/g, even more preferably not less than 65 mgKOH/g and further even more preferably not less than 70 mgKOH/g. When the value of the condition 1 lies within the aforementioned range, the resulting water-based pigment dispersion or water-based ink is capable of ensuring good storage stability without causing any damage to dispersion stability thereof owing to electrostatic repulsion. On the other hand, the value of the condition 1 is preferably not more than 200 mgKOH/g, more preferably not more than 180 mgKOH/g, even more preferably not more than 160 mgKOH/g and further even more preferably not more than 150 mgKOH/g. When the value of the condition 1 lies within the aforementioned range, the resulting water-based pigment dispersion or water-based ink is capable of ensuring good storage stability without causing any damage to adsorption of the polymer to the pigment.

The neutralization degree as used herein means a ratio of a mole equivalent number of the neutralizing agent to a mole equivalent number of the ionic groups of the polymer [(mole equivalent number of neutralizing agent)/(mole equivalent number of ionic groups of polymer)].
[Condition 2]

The condition 2 is such a requirement that a value calculated according to the formula:

[(crosslinking degree)/100]×[acid value of carboxy group-containing polymer], is not less than 40 mgKOH/g and not more than 180 mgKOH/g.

The value of the condition 2 represents an amount of the carboxy groups crosslinked among the whole carboxy groups contained in the polymer.

The crosslinking degree of the polymer as used herein is an apparent crosslinking degree calculated from an acid value of the polymer and an equivalent amount of the reactive functional groups of the crosslinking agent, i.e., is expressed by the ratio of a mole equivalent number of the reactive functional groups of the polyfunctional compound to a mole equivalent number of the ionic groups of the polymer [(mole equivalent number of reactive functional groups of polyfunctional compound)/(mole equivalent number of ionic groups of polymer)]. The crosslinking degree is represented in terms of an acid value per 1 g of the polymer used for dispersing the pigment. In the case where the reactive functional groups of the polyfunctional compound all are epoxy groups, a mole equivalent number of the epoxy groups is equal to a mole equivalent number of the reactive functional groups.

The value of the condition 2 is preferably not less than 40 mgKOH/g, more preferably not less than 50 mgKOH/g, even more preferably not less than 60 mgKOH/g and further even more preferably not less than 70 mgKOH/g. When the value of the condition 2 lies within the aforementioned range, the resulting water-based pigment dispersion or water-based ink is capable of ensuring good storage stability without causing any damage to adsorption of the polymer to the pigment. On the other hand, the value of the condition 2 is preferably not more than 180 mgKOH/g, more preferably not more than 160 mgKOH/g, even more preferably not more than 150 mgKOH/g and further even more preferably not more than 140 mgKOH/g. When the value of the condition 2 lies within the aforementioned range, the resulting water-based pigment dispersion or water-based ink is capable of ensuring excellent water resistance and fixing properties by suppressing brittleness of a polymer film formed.

(Crosslinking Reaction Conditions)

The temperature used in the reaction between the ionic groups of the polymer A and the polyfunctional compound which are contained in the pigment water dispersion obtained in the step 2 is preferably not lower than 50° C., more preferably not lower than 55° C., even more preferably not lower than 60° C. and further even more preferably not lower than 65° C., and is also preferably not higher than 95° C. and more preferably not higher than 90° C., from the viewpoint of well completing the crosslinking reaction and attaining good cost efficiency.

In addition, the reaction time is preferably not less than 0.5 hour, more preferably not less than 1 hour and even more preferably not less than 2 hours, and is also preferably not more than 12 hours, more preferably not more than 10 hours and even more preferably not more than 8 hours, from the same viewpoint as described above.

The crosslinking degree of the polymer crosslinked is preferably not less than 5 mol %, more preferably not less than 10 mol % and even more preferably not less than 15 mol %, and is also preferably not more than 80 mol %, more preferably not more than 70 mol % and even more preferably not more than 60 mol %. The crosslinking degree of the polymer crosslinked is an apparent crosslinking degree calculated from an acid value of the polymer and an equivalent amount of the reactive functional groups of the crosslinking agent, as described previously.

The average particle size of the pigment-containing crosslinked polymer particles obtained after the crosslinking reaction is preferably not less than 60 nm, more preferably not less than 80 nm, even more preferably not less than 90 nm and further even more preferably not less than 100 nm, and is also preferably not more than 200 nm, more preferably not more than 180 nm, even more preferably not more than 160 nm and further even more preferably not more than 140 nm, from the viewpoint of improving dispersion stability and storage stability of the resulting water-based pigment dispersion and water-based ink.

The acid value of the pigment-containing crosslinked polymer obtained after the crosslinking reaction is not less than 0 mgKOH/g. From the viewpoint of improving dispersion stability of the resulting water-based pigment dispersion and water-based ink, the acid value is preferably not less than 10 mgKOH/g and more preferably not less than 25 mgKOH/g, and is also preferably not more than 100 mgKOH/g, more preferably not more than 80 mgKOH/g and even more preferably not more than 70 mgKOH/g.

[Water-Based Pigment Dispersion]

The water-based pigment dispersion according to the present invention may be obtained by the process for producing the water-based pigment dispersion which includes the aforementioned steps 1 to 3. The details of the water-based pigment dispersion are the same as described above.

The water-based pigment dispersion according to the present invention serves for production of a good printed material that is excellent in storage stability, fixing properties and water resistance, and therefore can be suitably used as a water-based pigment dispersion for obtaining an ink for flexographic printing, an ink for gravure printing or an ink for ink-jet printing, in particular, is preferably used as a water-based pigment dispersion for obtaining an ink for ink-jet printing.

[Process for Producing Water-Based Ink]

The process for producing the water-based ink according to the present invention includes the following steps 1 to 4:

Step 1: subjecting the ionic group-containing monomer (a) and the hydrophobic monomer (b) to polymerization reaction using the ionic group-containing polymerization initiator (x) and the ionic group-containing chain transfer agent (y) to obtain the ionic group-containing polymer A;

Step 2: mixing and dispersing the polymer A obtained in the step 1 and the pigment in the aqueous medium to obtain the pigment water dispersion;

Step 3: subjecting the polymer A in the pigment water dispersion obtained in the step 2 to crosslinking reaction with the polyfunctional compound to obtain the water-based pigment dispersion; and Step 4: mixing the water-based pigment dispersion obtained in the step 3 with the organic solvent to obtain the water-based ink.

The details of the steps 1 to 3 are the same as described above.

In the step 4, the water-based pigment dispersion obtained in the step 3 is mixed with the organic solvent, and if required, further mixed with water and various additives such as a surfactant, to thereby efficiently produce the water-based ink.

The method for mixing the aforementioned respective components is not particularly limited.

The organic solvent is used from the viewpoint of improving storage stability, etc., of the water-based ink. Examples of the organic solvent used in the step 4 include polyhydric alcohols, polyhydric alcohol alkyl ethers, polyhydric alcohol aryl ethers, cyclic carbonates, nitrogen-containing heterocyclic compounds, amides, amines, sulfur-containing compounds, etc.

Of these organic solvents, preferred is at least one organic solvent selected from the group consisting of polyhydric alcohols and polyhydric alcohol alkyl ethers, and more preferred is at least one organic solvent selected from the group consisting of ethylene glycol, propylene glycol, diethylene glycol, triethylene glycol, dipropylene glycol, 1,2-butanediol, 1,2-hexanediol, glycerin, trimethylolpropane, diethylene glycol monomethyl ether and dipropylene glycol monomethyl ether.

Examples of the surfactant include a nonionic surfactant, an anionic surfactant, an ampholytic surfactant, a silicone-based surfactant, a fluorine-based surfactant, etc. Among these surfactants, preferred is a nonionic surfactant.

Examples of the other additives that may be used in the process for producing the water-based ink include a humectant, a wetting agent, a penetrant, a viscosity controller, a defoaming agent, an antiseptic agent, a mildew-proof agent and a rust preventive.

The contents of the respective components in the water-based ink obtained by the production process of the present invention as well as properties of the water-based ink are as follows.

(Content of Pigment)

The content of the pigment in the water-based ink is preferably not less than 1% by mass, more preferably not less than 2% by mass and even more preferably not less than 3% by mass from the viewpoint of enhancing optical density of the water-based ink upon printing. Also, the content of the pigment in the water-based ink is preferably not more than 15% by mass, more preferably not more than 10% by mass and even more preferably not more than 7% by mass from the viewpoint of reducing viscosity of the ink upon volatilization of the solvent therefrom and improving ejection stability and storage stability of the water-based ink.

(Total Content of Pigment and Polymer)

The total content of the pigment and the polymer in the water-based ink is preferably not less than 2% by mass, more preferably not less than 3% by mass and even more preferably not less than 4% by mass, and is also preferably not more than 15% by mass, more preferably not more than 12% by mass, even more preferably not more than 10% by mass and further even more preferably not more than 8% by mass.

(Properties of Water-Based Ink)

The viscosity of the water-based ink as measured at 32° C. is preferably not less than 2 mPa·s, more preferably not less than 3 mPa·s and even more preferably not less than 5 mPa·s, and is also preferably not more than 12 mPa·s, more preferably not more than 9 mPa·s and even more preferably not more than 7 mPa·s, from the viewpoint of improving storage stability of the water-based ink.

The pH value of the water-based ink is preferably not less than 7, more preferably not less than 7.2 and even more preferably not less than 7.5 from the viewpoint of improving storage stability of the water-based ink, and is also preferably not more than 11, more preferably not more than 10 and even more preferably not more than 9.5 from the viewpoint of improving resistance of members to the water-based ink and suppressing skin irritation.

[Water-Based Ink]

The water-based ink of the present invention may be obtained by the process for producing the water-based ink which includes the aforementioned steps 1 to 4. The details of the water-based ink are the same as described above.

The water-based ink of the present invention is excellent in redispersibility and flowability by which it becomes possible to suppress clogging of ink ejection nozzles owing to solidification of the pigment or the polymer in the ink ejection nozzles when using the water-based ink in an ink-jet printing method. Therefore, the water-based ink of the present invention is preferably used as a water-based ink for ink-jet printing.

[Ink-Jet Printing Method]

The water-based pigment dispersion and the water-based ink according to the present invention may be loaded to a conventionally known ink-jet printing apparatus to eject droplets of the ink onto a printing medium, thereby forming characters or images, etc., on the printing medium.

The ink-jet printing apparatus may be in the form of either a thermal-type ink-jet printer or a piezoelectric-type ink-jet printer. The water-based ink according to the present invention is preferably used as a water-based ink for ink-jet printing using the piezoelectric-type ink-jet printer.

Examples of the printing medium usable in the present invention include a high-water absorbing plain paper, a low-water absorbing coated paper and a synthetic resin film. Specific examples of the coated paper include a versatile glossy coated paper, a multi-color foam glossy coated paper, etc. Specific examples of the synthetic resin film include a polyester film, a polyvinyl chloride film, a polypropylene film, a polyethylene film, etc.

EXAMPLES

In the following Preparation Examples, Production Examples, Examples and Comparative Examples, the "part(s)" and "%" indicate "part(s) by mass" and "% by mass", respectively, unless otherwise specified.

Meanwhile, the methods of measuring respective properties and characteristics are as follows.

(1) Measurement of Weight-Average Molecular Weight of Polymer A

The weight-average molecular weight of the polymer A was measured by gel permeation chromatography [GPC apparatus: "HLC-8120GPC" available from Tosoh Corporation; columns: "TSK-GEL, α-M"×2 available from Tosoh Corporation; flow rate: 1 mL/min)] using a solution prepared by dissolving phosphoric acid (guaranteed reagent) available from FUJIFILM Wako Pure Chemical Corporation and lithium bromide (reagent) available from Tokyo Chemical Industry Co., Ltd., in N,N-dimethylformamide (for high-performance liquid chromatography) available from FUJIFILM Wako Pure Chemical Corporation such that the concentrations of phosphoric acid and lithium bromide in the resulting solution were 60 mmol/L and 50 mmol/L, respectively, as an eluent, and using monodisperse polystyrenes having known molecular weights as a reference standard substance.

(2) Measurement of Acid Value of Polymer A

The acid value of the polymer A was measured by the same method as prescribed in JIS K 0070 except that a mixed solvent of ethanol and ether used as a measuring solvent in the method was replaced with a mixed solvent containing acetone and toluene at a volume ratio [acetone:toluene] of 1:1.

(3) Measurement of Average Particle Size of Pigment-Containing Polymer Particles The pigment-containing polymer particles were subjected to cumulant analysis using a laser particle analyzing system "ELS-8000" available from Otsuka Electrics Co., Ltd., to measure an average particle size thereof. In the cumulant analysis, there was used a dispersion prepared by diluting a sample with water such that the concentration of the particles to be measured in the resulting dispersion was adjusted to about $5 \times 10^{-3}\%$ by mass. The measurement was conducted under the conditions including a temperature of 25° C., an angle between incident light and detector of 90° and a cumulative number of 100 times, and a refractive index of water (1.333) was input to the analyzing system as a refractive index of the dispersing medium. The cumulant average particle size thus determined was defined as an average particle size of the water-insoluble polymer particles or the pigment-containing polymer particles.

(4) Measurement of Solid Contents of Polymer Solution and Pigment Water Dispersion Sodium sulfate dried to constant weight in a desiccator was weighed in an amount of 10.0 g and charged in a 30 mL polypropylene container (φ: 40 mm; height: 30 mm), and 1.0 g of a sample to be measured was added to the container. The contents of the container were mixed and then accurately weighed. The resulting mixture was maintained in the container at 105° C. for 2 hours to remove volatile components therefrom and further allowed to stand in a desiccator for 15 minutes to measure a mass thereof. The mass of the sample thus measured after removing the volatile components therefrom was regarded as a mass of solids therein. The solid content of the sample was calculated by dividing the mass of the solids by the mass of the sample initially charged.

(5) Measurement of Water Solubility Rate of Polyfunctional Epoxy Compound

A glass tube (25 mmφ in diameter×250 mm in height) was charged with 90 parts by mass of ion-exchanged water and 10 parts by mass (W1) of a polyfunctional epoxy compound at room temperature (25° C.). The glass tube thus charged was allowed to stand for 1 hour in a thermostatic bath controlled to a water temperature of 25° C. Next, the contents of the glass tube were vigorously shaken for 1 minute, and then the glass tube was placed again in the thermostatic bath, followed by allowing the glass tube to stand in the thermostatic bath for 12 hours. Then, undissolved components that were separated from water and precipitated or floated in the dispersion were recovered therefrom and then dried at 40° C. under the environmental condition of a gauge pressure of −0.08 MPa for 6 hours, followed by measuring a mass (W2) of the thus dried product. The water solubility rate (% by mass) of the polyfunctional epoxy compound was calculated according to the following formula.

Water Solubility Rate (% by mass)=$\{(W1-W2)/W1\}\times 100$

<Preparation of Polymer A (Step 1)>

Preparation Example 1

Thirty one (31) parts of acrylic acid and 69 parts of styrene were mixed with each other to prepare a monomer mixture solution. Five (5) parts of methyl ethyl ketone (MEK) and 0.25 part of 3-mercaptopropionic acid as a chain transfer agent as well as 10% of the monomer mixture solution prepared above were charged into a reaction vessel and mixed with each other, and then an inside atmosphere of the reaction vessel was fully replaced with nitrogen gas.

On the other hand, a mixed solution prepared by mixing remaining 90% of the monomer mixture solution, 2.25 parts of the aforementioned chain transfer agent, 75 parts of MEK and 1.5 parts of 4,4'-azobis(4-cyanovaleric acid) as an azo-based radical polymerization initiator "V-501" (tradename) available from FUJIFILM Wako Pure Chemical Corporation was charged into a dropping funnel. In a nitrogen atmosphere, the above-prepared monomer mixed solution in the reaction vessel was heated to 77° C. while stirring, and then the mixed solution in the dropping funnel was added dropwise thereinto over 5 hours. After completion of the dropwise addition, a solution prepared by dissolving 0.5 part of the aforementioned polymerization initiator in 5 parts of MEK was added to the reaction vessel, and the contents of the reaction vessel were further reacted at 77° C. for 2 hours to thereby obtain a carboxy group-containing polymer solution 1 (solid content: 55%; weight-average molecular weight of the polymer: 13900).

Preparation Examples 2 to 4

The same procedure as in Preparation Example 1 was repeated except that the amounts of acrylic acid and styrene used were changed as shown in Table 1, thereby obtaining carboxy group-containing polymer solutions 2 to 4.

Preparation Example 5

Thirty one (31) parts of acrylic acid, 57 parts of styrene and 12 parts of α-methyl styrene were mixed with each other to prepare a monomer mixture solution. Five (5) parts of methyl ethyl ketone (MEK) and 0.25 part of 3-mercaptopropionic acid as a chain transfer agent as well as 10% of the monomer mixture solution prepared above were charged into a reaction vessel and mixed with each other, and then an inside atmosphere of the reaction vessel was fully replaced with nitrogen gas.

On the other hand, a mixed solution prepared by mixing remaining 90% of the monomer mixture solution, 2.25 parts of the aforementioned chain transfer agent, 75 parts of MEK and 1.5 parts of 4,4'-azobis(4-cyanovaleric acid) as an azo-based radical polymerization initiator "V-501" (tradename) available from FUJIFILM Wako Pure Chemical Corporation was charged into a dropping funnel. In a nitrogen atmosphere, the above-prepared monomer mixed solution in the reaction vessel was heated to 77° C. while stirring, and then the mixed solution in the dropping funnel was added dropwise thereinto over 5 hours. After completion of the dropwise addition, a solution prepared by dissolving 0.5 part of the aforementioned polymerization initiator in 5 parts of MEK was added to the reaction vessel, and the contents of the reaction vessel were further reacted at 77° C. for 2 hours to thereby obtain a carboxy group-containing polymer solution 5 (weight-average molecular weight of the polymer: 12500).

Preparation Examples 6 and 7

The same procedure as in Preparation Example 5 was repeated except that the kinds and amounts of monomers used were changed as shown in Table 1, thereby obtaining carboxy group-containing polymer solutions 6 and 7.

Preparation Example 8

Thirty one (31) parts of acrylic acid and 69 parts of styrene were mixed with each other to prepare a monomer mixture solution. Five (5) parts of methyl ethyl ketone (MEK) and 0.22 part of thioglycolic acid as a chain transfer agent as well as 10% of the monomer mixture solution prepared above were charged into a reaction vessel and mixed with each other, and then an inside atmosphere of the reaction vessel was fully replaced with nitrogen gas.

On the other hand, a mixed solution prepared by mixing remaining 90% of the monomer mixture solution, 1.98 parts of the aforementioned chain transfer agent, 75 parts of MEK and 1.5 parts of 4,4'-azobis(4-cyanovaleric acid) as an azo-based radical polymerization initiator "V-501" (tradename) available from FUJIFILM Wako Pure Chemical Corporation was charged into a dropping funnel. In a nitrogen atmosphere, the above-prepared monomer mixed solution in the reaction vessel was heated to 77° C. while stirring, and then the mixed solution in the dropping funnel was added dropwise thereinto over 5 hours. After completion of the dropwise addition, a solution prepared by dissolving 0.5 part of the aforementioned polymerization initiator in 5 parts of MEK was added to the reaction vessel, and the contents of the reaction vessel were further reacted at 77° C. for 2 hours to thereby obtain a carboxy group-containing polymer solution 8 (solid content: 55%; weight-average molecular weight of the polymer: 15800).

Preparation Example 9

Thirty one (31) parts of acrylic acid and 69 parts of styrene were mixed with each other to prepare a monomer mixture solution. Five (5) parts of methyl ethyl ketone (MEK) and 0.35 part of mercaptosuccinic acid as a chain transfer agent as well as 10% of the monomer mixture solution prepared above were charged into a reaction vessel and mixed with each other, and then an inside atmosphere of the reaction vessel was fully replaced with nitrogen gas.

On the other hand, a mixed solution prepared by mixing remaining 90% of the monomer mixture solution, 3.15 parts of the aforementioned chain transfer agent, 75 parts of MEK and 1.5 parts of 4,4'-azobis(4-cyanovaleric acid) as an azo-based radical polymerization initiator "V-501" (tradename) available from FUJIFILM Wako Pure Chemical Corporation was charged into a dropping funnel. In a nitrogen atmosphere, the above-prepared monomer mixed solution in the reaction vessel was heated to 77° C. while stirring, and then the mixed solution in the dropping funnel was added dropwise thereinto over 5 hours. After completion of the dropwise addition, a solution prepared by dissolving 0.5 part of the aforementioned polymerization initiator in 5 parts of MEK was added to the reaction vessel, and the contents of the reaction vessel were further reacted at 77° C. for 2 hours to thereby obtain a carboxy group-containing polymer solution 9 (solid content: 55%; weight-average molecular weight of the polymer: 15200).

Comparative Preparation Example 1

Thirty one (31) parts of acrylic acid and 69 parts of styrene were mixed with each other to prepare a monomer mixture solution. Five (5) parts of methyl ethyl ketone (MEK) and 0.18 part of 2-mercaptoethanol as a chain transfer agent as well as 10% of the monomer mixture solution prepared above were charged into a reaction vessel and mixed with each other, and then an inside atmosphere of the reaction vessel was fully replaced with nitrogen gas.

On the other hand, a mixed solution prepared by mixing remaining 90% of the monomer mixture solution, 1.62 parts of the aforementioned chain transfer agent, 75 parts of MEK and 1.5 parts of 2,2'-azobis(2,4-dimethylvaleronitrile) as an azo-based radical polymerization initiator "V-65" (tradename) available from FUJIFILM Wako Pure Chemical Corporation was charged into a dropping funnel. In a nitrogen atmosphere, the above-prepared monomer mixed solution in the reaction vessel was heated to 77° C. while stirring, and then the mixed solution in the dropping funnel was added dropwise thereinto over 5 hours. After completion of the dropwise addition, a solution prepared by dissolving 0.5 part of the aforementioned polymerization initiator in 5 parts of MEK was added to the reaction vessel, and the contents of the reaction vessel were further reacted at 77° C. for 2 hours to thereby obtain a carboxy group-containing polymer solution 10 (weight-average molecular weight of the polymer: 12300).

Comparative Preparation Example 2

The same procedure as in Preparation Example 1 was repeated except that the polymerization initiator used therein was replaced with 2,2'-azobis(2,4-dimethylvaleronitrile) as an azo-based radical polymerization initiator "V-65" (tradename) available from FUJIFILM Wako Pure Chemical Corporation, thereby obtaining a carboxy group-containing polymer solution 11 (weight-average molecular weight of the polymer: 12200).

Comparative Preparation Example 3

The same procedure as in Comparative Preparation Example 1 was repeated except that the polymerization initiator used therein was replaced with 4,4'-azobis(4-cyanovaleric acid) as an azo-based radical polymerization initiator "V-501" (tradename) available from FUJIFILM Wako Pure Chemical Corporation, thereby obtaining a carboxy group-containing polymer solution 12 (weight-average molecular weight of the polymer: 12000).

TABLE 1

| | Preparation Examples | | | | | | | | |
|---|---|---|---|---|---|---|---|---|---|
| | 1 | 2 | 3 | 4 | 5 | 6 | 7 | 8 | 9 |
| No. of polymer solution obtained | 1 | 2 | 3 | 4 | 5 | 6 | 7 | 8 | 9 |
| Composition formulated (part(s)) | | | | | | | | | |
| (a) Monomer | | | | | | | | | |
| Acrylic acid | 31 | 26 | 28 | 35 | 31 | 31 | 21 | 31 | 31 |
| Methacrylic acid | 0 | 0 | 0 | 0 | 0 | 0 | 12 | 0 | 0 |
| (b) Monomer | | | | | | | | | |
| Styrene | 69 | 74 | 72 | 65 | 57 | 46 | 67 | 69 | 69 |
| α-Methyl Styrene | 0 | 0 | 0 | 0 | 12 | 23 | 0 | 0 | 0 |

TABLE 1-continued

| Chain transfer agent | | | | | | | | | |
|---|---|---|---|---|---|---|---|---|---|
| 3-Mercaptopropionic acid* | 2.5 | 2.5 | 2.5 | 2.5 | 2.5 | 2.5 | 2.5 | 0 | 0 |
| Thioglycolic acid* | 0 | 0 | 0 | 0 | 0 | 0 | 0 | 2.2 | 0 |
| Mercaptosuccinic acid* | 0 | 0 | 0 | 0 | 0 | 0 | 0 | 0 | 3.5 |
| 2-Mercaptoethanol | 0 | 0 | 0 | 0 | 0 | 0 | 0 | 0 | 0 |
| Polymerization initiator | | | | | | | | | |
| 4,4'-Azobis(4-cyanovaleric acid)* | 2.0 | 2.0 | 2.0 | 2.0 | 2.0 | 2.0 | 2.0 | 2.0 | 2.0 |
| 2,2'-Azobis(2,4-dimethylvaleronitrile) | 0 | 0 | 0 | 0 | 0 | 0 | 0 | 0 | 0 |
| Mass ratio of [(a)/(b)] | 0.45 | 0.35 | 0.39 | 0.54 | 0.45 | 0.45 | 0.49 | 0.45 | 0.45 |
| Results | | | | | | | | | |
| Acid value of polymer (mgKOH/g) | 240 | 200 | 220 | 270 | 240 | 240 | 240 | 240 | 240 |
| Weight-average molecular weight of polymer | 13900 | 15900 | 15200 | 11000 | 12500 | 10300 | 14500 | 15800 | 15200 |

| | Comparative Preparation Examples | | |
|---|---|---|---|
| | 1 | 2 | 3 |
| No. of polymer solution obtained | 10 | 11 | 12 |
| Composition formulated (part(s)) | | | |
| (a) Monomer | | | |
| Acrylic acid | 31 | 31 | 31 |
| Methacrylic acid | 0 | 0 | 0 |
| (b) Monomer | | | |
| Styrene | 69 | 69 | 69 |
| α-Methyl Styrene | 0 | 0 | 0 |
| Chain transfer agent | | | |
| 3-Mercaptopropionic acid* | 0 | 2.5 | 0 |
| Thioglycolic acid* | 0 | 0 | 0 |
| Mercaptosuccinic acid* | 0 | 0 | 0 |
| 2-Mercaptoethanol | 1.8 | 0 | 1.8 |
| Polymerization initiator | | | |
| 4,4'-Azobis(4-cyanovaleric acid)* | 0 | 0 | 2.0 |
| 2,2'-Azobis(2,4-dimethylvaleronitrile) | 2.0 | 2.0 | 0 |
| Mass ratio of [(a)/(b)] | 0.45 | 0.45 | 0.45 |
| Results | | | |
| Acid value of polymer (mgKOH/g) | 240 | 240 | 240 |
| Weight-average molecular weight of polymer | 12300 | 12200 | 12000 |

Note
*Ionic group-containing polymerization initiator or chain transfer agent

<Production of Pigment Water Dispersion (Step 2)>

Production Example 1 (Production of Pigment Water Dispersion 1)

(1) Production of Polymer Dispersion 1

Twenty four (24) parts of the polymer produced by drying the polymer solution 1 obtained in Preparation Example 1 under reduced pressure were mixed with 200 parts of ion-exchanged water and 9.7 parts of a 5N sodium hydroxide aqueous solution (content of sodium hydroxide as a solid component: 16.9%) to neutralize the polymer such that the ratio of the number of moles of sodium hydroxide to the number of moles of carboxy groups of the polymer was 40% (neutralization degree: 40 mol %). The resulting aqueous solution was heated at 90° C. for 5 hours while stirring at 150 rpm, thereby obtaining a polymer dispersion 1 (average particle size of polymer particles: 15 nm; solid content: 11%).

(2) Production of Pigment Water Dispersion 1

The polymer dispersion 1 obtained in the above item (1) was mixed with 76 parts of a magenta pigment "FASTOGEN SUPER MAGENTA JM-02" available from DIC Corporation. The resulting dispersion was stirred at 20° C. for 60 minutes using a disper "ULTRA DISPER" (tradename) available from Asada Iron Works Co., Ltd., while operating a disper blade thereof at a rotating speed of 7000 rpm.

The thus obtained mixture was subjected to dispersion treatment under a pressure of 200 MPa using "Microfluidizer" (tradename) available from Microfluidics Corporation by passing the mixture through the device 10 times. The resulting dispersion was subjected to filtration treatment using a 25 mL-capacity needleless syringe available from Terumo Corporation fitted with a 5 μm-mesh filter (acetyl cellulose membrane; outer diameter: 2.5 cm) available from FUJIFILM Corporation to remove coarse particles therefrom, and then ion-exchanged water was added to the resulting filtrate such that the solid content thereof was adjusted to 22%, thereby obtaining a pigment water dispersion 1 (average particle size of pigment-containing polymer particles: 121 nm) (pigment: 76%; polymer: 24%).

Production Examples 2 and 3 (Production of Pigment Water Dispersions 2 and 3)

The same procedure as in Production Example 1 was repeated except that in the item (1) of Production Example 1, the amount of the 5N sodium hydroxide aqueous solution used (neutralization degree) was changed as shown in Table 2, thereby obtaining pigment water dispersions 2 and 3.

Production Examples 4 to 11 (Production of Pigment Water Dispersions 4 to 11)

The same procedure as in Production Example 1 was repeated except that in the item (1) of Production Example 1, the polymer solutions 2 to 9 obtained in Preparation Examples 2 to 9, respectively, were used in place of the polymer solution 1 obtained in Preparation Example 1, and the amount of the 5N sodium hydroxide aqueous solution used was changed as shown in Table 2 such that the neutralization degree of the polymer was adjusted to 40 mol %, thereby obtaining pigment water dispersions 4 to 11.

Comparative Production Examples 1 to 3 (Production of Pigment Water Dispersions 12 to 14)

The same procedure as in Production Example 1 was repeated except that in the item (1) of Production Example 1, the polymer solutions 10 to 12 obtained in Comparative Preparation Examples 1 to 3, respectively, were used in place of the polymer solution 1 obtained in Preparation Example 1, thereby obtaining pigment water dispersions 12 to 14.

ing three epoxy groups in a molecule thereof "DENACOL EX-321" (molecular weight: 302; epoxy equivalent: 139; water solubility rate: 27%) as a crosslinking agent available from Nagase ChemteX Corporation were added to the glass bottle such that 40 mol % of the whole carboxy groups contained in the polymer were crosslinked, followed by hermetically sealing the glass bottle with a screw cap. The contents of the glass bottle were heated at 70° C. for 5 hours while stirring with a stirrer. After the elapse of 5 hours, the contents of the glass bottle were cooled to room temperature, and then subjected to filtration treatment using a 25 mL-capacity needleless syringe available from Terumo Corporation fitted with a 5 μm-mesh filter (acetyl cellulose membrane; outer diameter: 2.5 cm) available from FUJIFILM Corporation, thereby obtaining a water-based pigment dispersion 1 (average particle size of pigment-containing crosslinked polymer particles: 116 nm).

Examples 2 to 12 and Comparative Examples 1 to 3

The same procedure as in Example 1 was repeated except that the respective conditions were changed as shown in Table 3, thereby obtaining water-based pigment dispersions 2 to 15.

More specifically, in Example 2, the trimethylolpropane polyglycidyl ether "DENACOL EX-321" was used in such an amount that 55 mol % of the whole carboxy groups contained in the polymer were crosslinked, and in Examples 3 to 12 and Comparative Examples 1 to 3, the trimethylol-

TABLE 2

| | Production Examples | | | | | | | |
|---|---|---|---|---|---|---|---|---|
| | 1 | 2 | 3 | 4 | 5 | 6 | 7 | 8 |
| No. of pigment water dispersion obtained | 1 | 2 | 3 | 4 | 5 | 6 | 7 | 8 |
| No. of polymer solution | 1 | 1 | 1 | 2 | 3 | 4 | 5 | 6 |
| Mass ratio of [pigment/polymer] | 76/24 | 76/24 | 76/24 | 76/24 | 76/24 | 76/24 | 76/24 | 76/24 |
| Neutralization conditions | | | | | | | | |
| Kind of neutralizing agent | NaOH | NaOH | NaOH | NaOH | NaOH | NaOH | NaOH | NaOH |
| Amount of neutralizing agent (part(s)) | 9.7 | 7.3 | 14.6 | 8.1 | 8.9 | 11.0 | 9.7 | 9.7 |
| Neutralization degree (mol %) | 40 | 30 | 60 | 40 | 40 | 40 | 40 | 40 |
| Average particle size of polymer particles (nm) | 15 | 35 | 11 | 17 | 15 | 59 | 31 | 22 |

| | Production Examples | | | Comparative Production Examples | | |
|---|---|---|---|---|---|---|
| | 9 | 10 | 11 | 1 | 2 | 3 |
| No. of pigment water dispersion obtained | 9 | 10 | 11 | 12 | 13 | 14 |
| No. of polymer solution | 7 | 8 | 9 | 10 | 11 | 12 |
| Mass ratio of [pigment/polymer] | 76/24 | 76/24 | 76/24 | 76/24 | 76/24 | 76/24 |
| Neutralization conditions | | | | | | |
| Kind of neutralizing agent | NaOH | NaOH | NaOH | NaOH | NaOH | NaOH |
| Amount of neutralizing agent (part(s)) | 9.7 | 9.7 | 9.7 | 9.7 | 9.7 | 9.7 |
| Neutralization degree (mol %) | 40 | 40 | 40 | 40 | 40 | 40 |
| Average particle size of polymer particles (nm) | 23 | 15 | 15 | 214 | 30 | 28 |

<Production of Water-Based Pigment Dispersion (Step 3)>

Example 1

One hundred (100) parts of the pigment water dispersion 1 obtained in Production Example 1 (solid content: 22%) were sampled and filled in a screw-neck glass bottle, and 1.27 parts of trimethylolpropane polyglycidyl ether contain-propane polyglycidyl ether "DENACOL EX-321" was used in such an amount that 40 mol % of the whole carboxy groups contained in the polymer were crosslinked.

Comparative Example 4

The same procedure as in Example 1 was repeated except that no crosslinking agent was used, thereby obtaining a water-based pigment dispersion 16.

<Evaluation Tests for Water-Based Ink>
(Preparation of Water-Based Ink)

The respective water-based pigment dispersions obtained in the aforementioned Examples and Comparative Examples were used to prepare a mixture containing the pigment, glycerin, triethylene glycol and "ACETYLENOL E100" (a nonionic surfactant; an adduct of 2,4,7,9-tetramethyl-5-decyne-4,7-diol with 10 moles of ethyleneoxide) available from Kawaken Fine Chemical Co., Ltd., such that concentrations of these components were 5%, 15%, 10% and 0.5%, respectively, on the basis of a whole amount of a water-based ink to be produced, and then ion-exchanged water was further weighed and added to the mixture so as to adjust a whole amount of the resulting dispersion to 100%. The thus obtained dispersion was intimately mixed while stirring with a magnetic stirrer, and then subjected to filtration treatment using a 25 mL-capacity needleless syringe fitted with a 1.2 μm-mesh filter (acetyl cellulose membrane; outer diameter: 2.5 cm) available from FUJIFILM Corporation, thereby obtaining the water-based ink.

Using the thus obtained water-based ink, the following experiments 1 and 2 were carried out to evaluate the following properties of the water-based ink. The results are shown in Table 3.

Experiment 1 (Evaluation of Redispersibility)

The respective water-based inks prepared above were sampled in an amount of 10 μL using a micropipette and dropped on a slide glass, and then allowed to stand thereon at a temperature of 60° C. and a relative humidity of 40% for 24 hours to subject the respective water-based inks to evaporation to dryness.

Then, 200 μL of a vehicle for evaluation of redispersibility was added dropwise onto the dried solids remaining on the slide glass, and the solids were visually observed to evaluate redispersibility of the solids according to the following evaluation ratings.

Meanwhile, the vehicle for evaluation of redispersibility was prepared as follows. That is, glycerin, triethylene glycol and "ACETYLENOL E100" were mixed in amounts of 15%, 10% and 0.5%, respectively, and then ion-exchanged water was further weighed and added to the resulting mixture so as to adjust a whole amount of the resulting dispersion to 100%. The thus obtained dispersion was intimately mixed while stirring with a magnetic stirrer to prepare the vehicle for evaluation of redispersibility.

(Evaluation Ratings)
A: Solids were uniformly redispersed.
B: Solids were redispersed, but residues still remained.
C: No solids were redispersed.

Experiment 2 (Measurement of Viscosity of Ink Concentrated)

The respective water-based pigment dispersions obtained in the aforementioned Examples and Comparative Examples were used to prepare a mixture containing the pigment and glycerin such that concentrations of these components were 13% and 13%, respectively, on the basis of a whole amount of a water-based ink to be produced, and then ion-exchanged water was further weighed and added to the mixture so as to adjust a whole amount of the resulting dispersion to 100%. The thus obtained dispersion was intimately mixed while stirring with a magnetic stirrer, and then subjected to filtration treatment using a 25 mL-capacity needleless syringe fitted with a 1.2 μm-mesh filter (acetyl cellulose membrane; outer diameter: 2.5 cm) available from FUJIFILM Corporation, thereby obtaining the water-based ink. The resulting water-based ink was placed in a petri dish and concentrated by evaporating the solvent therefrom at 40° C. under reduced pressure until the solid content of the water-based ink was reduced to 57% by mass as compared to the solid content of the ink immediately after being prepared, thereby obtaining a concentrated water-based ink.

The viscosity of the resulting concentrated water-based ink was measured at 25° C. and a shear rate of 1 (1/s) using a rheometer "MCR301" (equipped with a cone plate "CP50-1") available from Anton Paar GmbH.

The smaller the viscosity value of the concentrated water-based ink, the more excellent the flowability of the water-based ink and the more excellent the ejection stability of the water-based ink.

TABLE 3

|  | Examples | | | | | | | |
|---|---|---|---|---|---|---|---|---|
|  | 1 | 2 | 3 | 4 | 5 | 6 | 7 | 8 |
| Production conditions of water-based pigment dispersion | | | | | | | | |
| No. of water-based pigment dispersion obtained | 1 | 2 | 3 | 4 | 5 | 6 | 7 | 8 |
| No. of pigment water dispersion | 1 | 1 | 2 | 3 | 4 | 5 | 6 | 7 |
| Amount of pigment water dispersion (part(s)) | 100 | 100 | 100 | 100 | 100 | 100 | 100 | 100 |
| Acid value of polymer dispersant (mgKOH/g) | 240 | 240 | 240 | 240 | 200 | 220 | 270 | 240 |
| Kind of crosslinking agent | EX-321 | EX-321 | EX-321 | EX-321 | EX-321 | EX-321 | EX-321 | EX-321 |
| Amount of crosslinking agent (part(s)) | 1.27 | 1.74 | 1.27 | 1.27 | 1.06 | 1.16 | 1.43 | 1.27 |
| Crosslinking degree (mol %) | 40 | 55 | 40 | 40 | 40 | 40 | 40 | 40 |
| 100 − (neutralization degree) − (crosslinking degree) | 20 | 5 | 30 | 0 | 20 | 20 | 20 | 20 |
| Condition 1 (mgKOH/g) | 96 | 96 | 72 | 144 | 80 | 88 | 108 | 96 |
| Condition 2 (mgKOH/g) | 96 | 132 | 96 | 96 | 80 | 88 | 108 | 96 |
| Residual acid value (mgKOH/g)* | 48 | 12 | 72 | 0 | 40 | 44 | 54 | 48 |
| Evaluation of ink | | | | | | | | |
| Average particle size (nm) | 116 | 120 | 120 | 122 | 120 | 123 | 123 | 123 |
| Redispersibility | A | A | A | A | B | A | A | A |
| Viscosity of ink concentrated (mPa · s) | 278 | 412 | 279 | 520 | 459 | 313 | 963 | 358 |

TABLE 3-continued

|  | Examples | | | | Comparative Examples | | | |
| --- | --- | --- | --- | --- | --- | --- | --- | --- |
|  | 9 | 10 | 11 | 12 | 1 | 2 | 3 | 4 |
| Production conditions of water-based pigment dispersion | | | | | | | | |
| No. of water-based pigment dispersion obtained | 9 | 10 | 11 | 12 | 13 | 14 | 15 | 16 |
| No. of pigment water dispersion | 8 | 9 | 10 | 11 | 12 | 13 | 14 | 1 |
| Amount of pigment water dispersion (part(s)) | 100 | 100 | 100 | 100 | 100 | 100 | 100 | 100 |
| Acid value of polymer dispersant (mgKOH/g) | 240 | 240 | 240 | 240 | 240 | 240 | 240 | 240 |
| Kind of crosslinking agent | EX-321 | EX-321 | EX-321 | EX-321 | EX-321 | EX-321 | EX-321 | — |
| Amount of crosslinking agent (part(s)) | 1.27 | 1.27 | 1.27 | 1.27 | 1.27 | 1.27 | 1.27 | 0 |
| Crosslinking degree (mol %) | 40 | 40 | 40 | 40 | 40 | 40 | 40 | 0 |
| 100 − (neutralization degree) − (crosslinking degree) | 20 | 20 | 20 | 20 | 20 | 20 | 20 | 60 |
| Condition 1 (mgKOH/g) | 96 | 96 | 96 | 96 | 96 | 96 | 96 | 96 |
| Condition 2 (mgKOH/g) | 96 | 96 | 96 | 96 | 96 | 96 | 96 | 0 |
| Residual acid value (mgKOH/g)* | 48 | 48 | 48 | 48 | 48 | 48 | 48 | 144 |
| Evaluation of ink | | | | | | | | |
| Average particle size (nm) | 126 | 125 | 118 | 121 | 119 | 123 | 129 | 121 |
| Redispersibility | A | B | A | A | C | C | C | C |
| Viscosity of ink concentrated (mPa · s) | 402 | 317 | 304 | 321 | 2387 | 1306 | 731 | 332 |

Note
*Residual acid value [acid value of crosslinked polymer] = [(100 − (neutralization degree) − (crosslinking degree))/100] × (acid value of polymer dispersant)
**Mass ratio of pigment to polymer [pigment/polymer] in pigment-containing polymer particles = 76/24

From Table 3, it was confirmed that the water-based inks produced using the water-based pigment dispersions obtained in Examples 1 to 12 were excellent in redispersibility and exhibited high flowability (low viscosity when concentrated) as compared to the water-based inks produced using the water-based pigment dispersions obtained in Comparative Examples 1 to 4.

INDUSTRIAL APPLICABILITY

The water-based pigment dispersion and the water-based ink which are produced according to the respective production processes of the present invention can ensure excellent redispersibility and high flowability by which occurrence of clogging of ink ejection nozzles owing to solidification of a pigment or a polymer in the ink ejection nozzles can be inhibited. Therefore, the water-based pigment dispersion and the water-based ink according to the present invention can be effectively used, in particular, as a water-based pigment dispersion and a water-based ink for ink-jet printing.

The invention claimed is:

1. A process for producing a water-based pigment dispersion, comprising the following steps 1 to 3:
   Step 1: subjecting an ionic group-containing monomer (a) and a hydrophobic monomer (b) to polymerization reaction using an ionic group-containing polymerization initiator (x) and an ionic group-containing chain transfer agent (y) to obtain an ionic group-containing polymer A;
   Step 2: mixing and dispersing the polymer A obtained in the step 1 and a pigment in an aqueous medium to obtain a pigment water dispersion; and
   Step 3: subjecting the polymer A in the pigment water dispersion obtained in the step 2 to crosslinking reaction with a polyfunctional compound to obtain the water-based pigment dispersion.

2. The process for producing a water-based pigment dispersion according to claim 1, wherein an acid value of the polymer A is not less than 150 mgKOH/g and not more than 310 mgKOH/g.

3. The process for producing a water-based pigment dispersion according to claim 1, wherein a weight-average molecular weight of the polymer A is not less than 6,000 and not more than 50,000.

4. The process for producing a water-based pigment dispersion according to claim 1, wherein the polymer A is a vinyl-based polymer comprising a constitutional unit derived from the at least one ionic group-containing monomer (a) selected from the group consisting of acrylic acid and methacrylic acid and a constitutional unit derived from the at least one hydrophobic monomer (b) selected from the group consisting of an alkyl (meth)acrylate and an aromatic group-containing monomer.

5. The process for producing a water-based pigment dispersion according to claim 1, wherein in the step 2, the polymer A is dispersed in the aqueous medium, and then the pigment is added to the resulting dispersion to obtain the pigment water dispersion.

6. The process for producing a water-based pigment dispersion according to claim 1, wherein the polyfunctional compound comprises an epoxy group as a reactive functional group thereof.

7. The process for producing a water-based pigment dispersion according to claim 1, wherein the polyfunctional compound is a glycidyl ether compound of a polyhydric alcohol comprising a hydrocarbon group having not less than 3 and not more than 8 carbon atoms.

8. The process for producing a water-based pigment dispersion according to claim 1, wherein the polymer A is in the form of a polymer comprising carboxy groups that are at least partially neutralized, and at least one of the following conditions 1 and 2 is satisfied:

Condition 1: a value calculated according to the formula:

[(neutralization degree)/100]×[acid value of carboxy group-containing polymer], being not less than 50 mgKOH/g and not more than 200 mgKOH/g; and Condition 2: a value calculated according to the formula:

[(crosslinking degree)/100]×[acid value of carboxy group-containing polymer], being not less than 40 mgKOH/g and not more than 180 mgKOH/g, wherein the neutralization degree means a ratio of a mole equivalent number of the neutralizing agent to a mole equivalent number of the ionic groups of the polymer [(mole equivalent number of neutralizing agent)/(mole equivalent number of ionic groups of polymer)], and the crosslinking degree means a ratio of a mole equivalent number of reactive functional groups of the polyfunctional compound to a mole equivalent number of the ionic groups of the polymer [(mole equivalent number of reactive functional groups of polyfunctional compound)/(mole equivalent number of ionic groups of polymer)].

9. The process for producing a water-based pigment dispersion according to claim 1, wherein the water-based pigment dispersion is used for ink-jet printing.

10. A water-based pigment dispersion that is produced by the process according to claim 1.

11. A process for producing a water-based ink, comprising the following steps 1 to 4:

Step 1: subjecting an ionic group-containing monomer (a) and a hydrophobic monomer (b) to polymerization reaction using an ionic group-containing polymerization initiator (x) and an ionic group-containing chain transfer agent (y) to obtain an ionic group-containing polymer A;

Step 2: mixing and dispersing the polymer A obtained in the step 1 and a pigment in an aqueous medium to obtain a pigment water dispersion;

Step 3: subjecting the polymer A in the pigment water dispersion obtained in the step 2 to crosslinking reaction with a polyfunctional compound to obtain a water-based pigment dispersion; and Step 4: mixing the water-based pigment dispersion obtained in the step 3 with an organic solvent to obtain the water-based ink.

12. A water-based ink that is produced by the process according to claim 11.

13. The process for producing a water-based pigment dispersion according to claim 1, wherein a crosslinking degree of the polymer crosslinked is not less than 5 mol % and not more than 80 mol %.

14. The process for producing a water-based pigment dispersion according to claim 1, wherein an average particle size of the pigment-containing crosslinked polymer particles obtained after the crosslinking reaction is not less than 60 nm and not more than 200 nm.

15. The process for producing a water-based pigment dispersion according to claim 1, wherein an acid value of the pigment-containing crosslinked polymer obtained after the crosslinking reaction is not less than 10 mgKOH/g and not more than 100 mgKOH/g.

16. The process for producing a water-based pigment dispersion according to claim 1, wherein the ionic group-containing polymerization initiator (x) is a polymerization initiator containing an anionic group.

17. The process for producing a water-based pigment dispersion according to claim 1, wherein the ionic group-containing polymerization initiator (x) is a polymerization initiator containing a carboxy group in a molecule thereof.

18. The process for producing a water-based pigment dispersion according to claim 1, wherein the ionic group-containing chain transfer agent (y) is a chain transfer agent containing an anionic group.

19. The process for producing a water-based pigment dispersion according to claim 1, wherein the ionic group-containing chain transfer agent (y) is at least one compound selected from the group consisting of 2-mercaptopropionic acid, 3-mercaptopropionic acid, mercaptosuccinic acid and thioglycolic acid.

20. The process for producing a water-based pigment dispersion according to claim 1, wherein an amount of the ionic group-containing chain transfer agent (y) is not less than 0.001 mol and not more than 0.5 mol per 1 mol of a raw material monomer.

* * * * *